US00RE49955E

(19) United States
(12) Reissued Patent
Bae

(10) Patent Number: US RE49,955 E
(45) Date of Reissued Patent: *Apr. 30, 2024

(54) WIRELESS POWER TRANSMITTING APPARATUS AND METHOD THEREOF

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: This patent is subject to a terminal disclaimer.

(21) Appl. No.: 17/675,619

(22) Filed: Feb. 18, 2022

Related U.S. Patent Documents

Reissue of:
(64) Patent No.: 9,711,974
Issued: Jul. 18, 2017
Appl. No.: 14/980,904
Filed: Dec. 28, 2015

U.S. Applications:
(63) Continuation of application No. 16/510,270, filed on Jul. 12, 2019, now Pat. No. Re. 49,017, which is an
(Continued)

(30) Foreign Application Priority Data

Mar. 19, 2012 (KR) ..... 10-2012-0027977
Dec. 14, 2012 (KR) ..... 10-2012-0146956

(51) Int. Cl.
*H02J 5/00* (2016.01)
*H02J 7/02* (2016.01)
(Continued)

(52) U.S. Cl.
CPC ..... *H02J 50/80* (2016.02); *H02J 50/10* (2016.02); *H02J 50/12* (2016.02); *H04B 5/79* (2024.01)

(58) Field of Classification Search
CPC . H02J 5/005; H02J 7/025; H02J 17/00; H04B 5/00; H04B 5/0037; H04B 10/2916;
(Continued)

(56) References Cited

U.S. PATENT DOCUMENTS 5,373,432 A * 12/1994 Vollin ..... H02M 3/3376 363/16
5,428,521 A * 6/1995 Kigawa ..... H01F 38/14 363/22
(Continued)

FOREIGN PATENT DOCUMENTS

CN 2660781 Y 12/2004
CN 101911029 A 12/2010
(Continued)

OTHER PUBLICATIONS

Office Action dated Sep. 2, 2014 in Chinese Application No. 201310088465.2.
(Continued)

*Primary Examiner* — My Trang Ton
(74) *Attorney, Agent, or Firm* — Birch, Stewart, Kolasch & Birch, LLP

(57) ABSTRACT

Disclosed are a wireless power transmitting apparatus and a method thereof. The wireless power transmitting apparatus wirelessly transmits power to a wireless power receiving apparatus. The wireless power transmitting apparatus detects a wireless power transmission state between the wireless power transmitting apparatus and the wireless power receiving apparatus, and generates a control signal to control transmit power based on the detected wireless power transmission state. The wireless power transmitting apparatus generates the transmit power by using first DC power based on the control signal, and transmits the transmit power to a transmission resonance coil through a transmission induction coil unit based on an electromagnetic induction scheme.

20 Claims, 15 Drawing Sheets

Related U.S. Application Data application for the reissue of Pat. No. 9,711,974, which is a continuation of application No. 13/826,526, filed on Mar. 14, 2013, now Pat. No. 9,225,391.

(51) Int. Cl.

| | |
|---|---|
| ***H02J 50/10*** | (2016.01) |
| ***H02J 50/12*** | (2016.01) |
| ***H02J 50/80*** | (2016.01) |
| ***H04B 5/79*** | (2024.01) |

(58) Field of Classification Search

CPC ..... H01F 38/14; B60L 11/182; H04W 52/24; H04W 52/50; H04W 52/367; H04W 52/12; H04W 52/40; H01S 3/302; H01S 3/06754; H01S 3/094096; H01S 3/06758

USPC ..... 307/104; 455/522; 359/334

See application file for complete search history.

(56) References Cited

U.S. PATENT DOCUMENTS

| | | | | |
|---|---|---|---|---|
| 5,546,295 | A | 8/1996 | Prete et al. | |
| 7,443,113 | B2 | 10/2008 | Crouse et al. | |
| 8,374,545 | B2 | 2/2013 | Menegoli et al. | |
| 8,497,658 | B2 | 7/2013 | Von Novak et al. | |
| 2009/0127937 | A1 | 5/2009 | Cook et al. | |
| 2010/0001744 | A1* | 1/2010 | Hirayama | C23C 16/345 324/645 |
| 2010/0084918 | A1 | 4/2010 | Fells et al. | |
| 2010/0085784 | A1* | 4/2010 | Chou | H02M 3/156 363/45 |
| 2010/0109443 | A1 | 5/2010 | Cook et al. | |
| 2011/0038190 | A1 | 2/2011 | Zimpfer | |
| 2011/0057607 | A1 | 3/2011 | Carobolante | |
| 2011/0089848 | A1* | 4/2011 | Ohsawa | H05B 41/2887 315/246 |
| 2011/0127846 | A1 | 6/2011 | Urano | |
| 2011/0199046 | A1 | 8/2011 | Tsai et al. | |
| 2011/0254377 | A1* | 10/2011 | Wildmer | B60L 11/182 307/104 |
| 2011/0266880 | A1 | 11/2011 | Kim et al. | |
| 2012/0043825 | A1* | 2/2012 | Urano | H02J 5/005 307/104 |
| 2012/0098348 | A1 | 4/2012 | Inoue et al. | |
| 2012/0212178 | A1* | 8/2012 | Kim | H02J 7/025 320/108 |
| 2012/0262004 | A1* | 10/2012 | Cook | H01Q 1/2225 307/104 |
| 2013/0026981 | A1* | 1/2013 | Van Der Lee | H02J 5/005 320/108 |
| 2013/0154373 | A1* | 6/2013 | Lisuwandi | H02J 5/005 307/34 |
| 2013/0241304 | A1 | 9/2013 | Bae | |

FOREIGN PATENT DOCUMENTS

| | | | |
|---|---|---|---|
| CN | 102082469 | A | 6/2011 |
| CN | 102239619 | A | 11/2011 |
| JP | 9-182304 | A | 7/1997 |
| JP | 10-136653 | A | 5/1998 |
| JP | 2006-217731 | A | 8/2006 |
| JP | 2011-508578 | A | 3/2011 |
| JP | 2011-91991 | A | 5/2011 |
| JP | 2011-135760 | A | 7/2011 |
| JP | 2012-504931 | A | 2/2012 |
| JP | 5643362 | B2 | 12/2014 |
| KR | 10-2010-008430 | A | 8/2010 |
| KR | 10-2010-0088430 | A | 8/2010 |
| KR | 10-2011-0065552 | A | 6/2011 |
| KR | 20110065552 | A | 6/2011 |
| KR | 10-2011-0106456 | A | 9/2011 |
| KR | 20110106456 | A | 9/2011 |
| KR | 10-2011-0137392 | A | 12/2011 |
| KR | 10-2012-0073236 | A | 7/2012 |
| WO | WO 2011/032048 | A1 | 3/2011 |

OTHER PUBLICATIONS

European Search Report dated Jul. 15, 2013 in European Application No. 13159585.2.

Office Action dated Aug. 28, 2013 in Korean Application No. 10-2012-0027977, filed Mar. 19, 2012.

Office Action dated Feb. 18, 2014 in Japanese Application No. 2013-053241.

Office Action dated Jan. 10, 2017 in Japanese Application No. 2014-221116.

* cited by examiner

WIRELESS POWER TRANSMITTING APPARATUS AND METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application is a continuation of U.S. application Ser. No. 13/826,526, filed Mar. 14, 2013, which claims the benefit under 35 U.S.C. §119 of Korean Patent Application Nos. 10-2012-0027977, filed Mar. 19, 2012 and 10-2012-0146956, filed Dec. 14, 2012, which are hereby incorporated by reference in their entirety.] *This Application is a Continuation Reissue of U.S. patent application Ser. No. 16/510,270 filed on Jul. 12, 2019, which is a Reissue of U.S. application Ser. No. 14/980,904, issued as U.S. Pat. No. 9,711,974 on Jul. 18, 2017, which is a Continuation of U.S. patent application Ser. No. 13/826,526 filed on Mar. 14, 2013 (now U.S. Pat. No. 9,225,391 issued on Dec. 29, 2015), which claims the priority benefit under 35 U.S.C. § 119(a) to Korean Patent Application Nos. 10-2012-0146956 filed on Dec. 14, 2012 and 10-2012-0027977 filed on Mar. 19, 2012, both filed in the Republic of Korea, all of which are hereby expressly incorporated by reference into the present application. More than one Reissue Application has been filed for U.S. Pat. No. 9,711,974: the present application and U.S. patent application Ser. No. 16/510,270.*

BACKGROUND

The disclosure relates to a wireless power transmitting apparatus and a method thereof.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance is short.

Until now, wireless energy transmission schemes include a remote telecommunication technology based on magnetic resonance and a short wave radio frequency in addition to the electromagnetic induction.

Recently, among wireless power transmitting technologies, an energy transmitting scheme employing magnetic resonance has been widely used.

In a wireless power transmitting system employing magnetic resonance, since an electrical signal generated between the wireless power transmitting apparatus and the wireless power receiving apparatus is wirelessly transferred through coils, a user may easily charge electronic appliances such as a portable device.

A wireless power transmitting apparatus generates AC power having a resonance frequency to be transmitted to a wireless power receiving apparatus. In this case, power transmission efficiency is determined due to various factors. The demand for wireless power transmission efficiency is increased.

BRIEF SUMMARY

The disclosure provides a wireless power transmitting apparatus capable of improving wireless power transmission efficiency and a method thereof.

According to the embodiment, there is provided a wireless power transmitting apparatus wirelessly transmitting power to a wireless power receiving apparatus. The wireless power transmitting apparatus includes a detector detecting a wireless power transmission state between the wireless power transmitting apparatus and the wireless power receiving apparatus, a transmit power controller generating a control signal to control transmit power based on the detected wireless power transmission state, an AC power generator generating an AC power using first DC power based on the control signal, and a transmission induction coil unit transmitting the AC power to a transmission resonance coil through an electromagnetic induction scheme.

According to the embodiment, there is provided a wireless power transmitting apparatus wirelessly transmitting power to a wireless power receiving apparatus. The wireless power transmitting apparatus includes a transmission induction coil transmitting power applied thereto to a transmission resonance coil through an electromagnetic induction scheme, a transistor circuit unit having a full-bridge structure and connected to the transmission induction coil, a detector detecting a wireless power transmission state between the wireless power transmitting apparatus and the wireless power receiving apparatus, and a transmit power controller controlling the transistor circuit unit having the full-bridge structure based on the detected wireless power transmission state.

As described above, according to the embodiment, the efficiency of the wireless power transmitting apparatus can be increased.

In addition, according to the embodiment, circuits can be inhibited from being destroyed due to high current.

DETAILED DESCRIPTION

Figure 1:
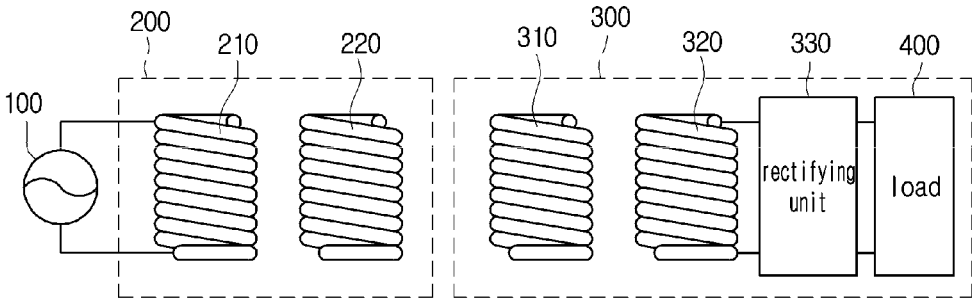
FIG. 1 is a view showing a wireless power system according to one embodiment.

Hereinafter, embodiments will be described in detail with reference to accompanying drawings so that those skilled in the art can easily work with the embodiments. However, the embodiments may not be limited to those described below, but have various modifications. The elements, which are not concerned with the description of the embodiments in the drawings, may be omitted for the purpose of convenience or clarity. The same reference numbers will be assigned the same elements throughout the drawings.

In the following description, when a predetermined part "includes" a predetermined component, the predetermined part does not exclude other components, but may further include other components unless indicated otherwise.

Hereinafter, a wireless power transmitting system according to one embodiment will be described with reference to FIGS. 1 to 4.

FIG. 1 is a view showing a wireless power system according to one embodiment.

Referring to FIG. 1, the wireless power transmitting system may include a power supply device 100, a wireless power transmitting apparatus 200, a wireless power receiving apparatus 300 and a load 400.

According to one embodiment, the power supply device 100 may be included in the wireless power transmitting apparatus 200.

The wireless power transmitting apparatus 200 may include a transmission induction coil unit 210 and a transmission resonant coil unit 220.

The wireless power receiving apparatus 300 may include a reception resonant coil unit 310, a reception induction coil unit 320, and a rectifying unit 330.

Both terminals of the power supply device 100 are connected to both terminals of the transmission induction coil unit 210.

The transmission resonant coil unit 220 may be spaced apart from the transmission induction coil unit 210 by a predetermined distance.

The reception resonant coil unit 310 may be spaced apart from the reception induction coil unit 320 by a predetermined distance.

Both terminals of the reception induction coil unit 320 are connected to both terminals of the rectifying unit 330, and the load 400 is connected to both terminals of the rectifying unit 330. According to one embodiment, the load 400 may be included in the wireless power receiving apparatus 300.

The power generated from the power supply device 100 is transmitted to the wireless power transmitting apparatus 200. The power received in the wireless power transmitting apparatus 200 is transmitted to the wireless power receiving apparatus 300 that makes resonance with the wireless power transmitting apparatus 200 due to a resonance phenomenon, that is, has the resonance frequency the same as that of the wireless power transmitting apparatus 200.

Hereinafter, the power transmission process will be described in more detail.

The power supply device 100 generates AC power having a predetermined frequency and transmits the AC power to the wireless power transmitting apparatus 200.

The transmission induction coil unit 210 and the transmission resonant coil unit 220 are inductively coupled with each other. In other words, if AC current flows through the transmission induction coil unit 210 due to the power received from the power supply apparatus 100, the AC current is induced to the transmission resonant coil unit 220 physically spaced apart from the transmission induction coil unit 210 due to the electromagnetic induction.

Thereafter, the power received in the transmission resonant coil unit 220 is transmitted to the wireless power receiving apparatus 300, which makes a resonance circuit with the wireless power transmitting apparatus 200, through resonance.

Power can be transmitted between two LC circuits, which are impedance-matched with each other, through resonance. The power transmitted through the resonance can be farther transmitted with higher efficiency when comparing with the power transmitted by the electromagnetic induction.

The reception resonant coil unit 310 receives power from the transmission resonant coil unit 220 through the resonance. The AC current flows through the reception resonant coil unit 310 due to the received power. The power received in the reception resonant coil unit 310 is transmitted to the reception induction coil unit 320, which is inductively coupled with the reception resonant coil unit 310, due to the electromagnetic induction. The power received in the reception induction coil unit 320 is rectified by the rectifying unit 330 and transmitted to the load 400.

According to one embodiment, the transmission induction coil unit 210, the transmission resonant coil unit 220, the reception resonant coil unit 310, and the reception resonant coil unit 320 may have the shape of a circle, an oval, or a rectangle, but the embodiment is not limited thereto.

The transmission resonant coil unit 220 of the wireless power transmitting apparatus 200 may transmit power to the reception resonant coil unit 310 of the wireless power receiving apparatus 300 through a magnetic field.

In detail, the transmission resonant coil unit 220 and the reception resonant coil unit 310 are resonance-coupled with each other so that the transmission resonant coil unit 220 and the reception resonant coil unit 310 operate at a resonance frequency.

The resonance-coupling between the transmission resonant coil unit 220 and the reception resonant coil unit 310 can significantly improve the power transmission efficiency between the wireless power transmitting apparatus 200 and the wireless power receiving apparatus 300.

A quality factor and a coupling coefficient are important in the wireless power transmission. In other words, the power transmission efficiency can be gradually improved as the values of the quality factor and the coupling coefficient are increased.

The quality factor may refer to an index of energy that may be stored in the vicinity of the wireless power transmitting apparatus 200 or the wireless power receiving apparatus 300.

The quality factor may vary according to the operating frequency ω as well as a shape, a dimension and a material of a coil. The quality factor may be expressed as following equation, $Q=\omega*L/R$. In the above equation, L refers to the inductance of a coil and R refers to resistance corresponding to the quantity of power loss caused in the coil.

The quality factor may have a value of 0 to infinity The power transmission efficiency between the wireless power transmitting apparatus 200 and the wireless power receiving apparatus 300 can be improved as the value of the quality factor is increased.

The coupling coefficient represents the degree of magnetic coupling between a transmission coil and a reception coil, and has a value of 0 to 1.

The coupling coefficient may vary according to the relative position and the distance between the transmission coil and the reception coil.

Figure 2:
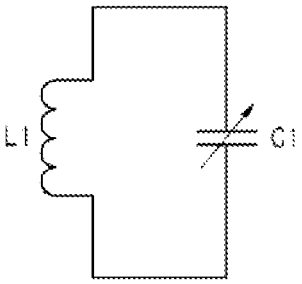
FIG. 2 is a circuit diagram showing an equivalent circuit of the transmission induction coil unit according to the one embodiment.

FIG. 2 is a circuit diagram showing an equivalent circuit of the transmission induction coil unit 210 according to the one embodiment.

As shown in FIG. 2, the transmission induction coil unit 210 may include an inductor L1 and a capacitor C1, and a circuit having a desirable inductance and a desirable capacitance can be constructed by the inductor L1 and the capacitor C1.

The transmission induction coil unit 210 may be constructed as an equivalent circuit in which both terminals of the inductor L1 are connected to both terminals of the capacitor C1. In other words, the transmission induction coil unit 210 may be constructed as an equivalent circuit in which the inductor L1 is connected to the capacitor C1 in parallel.

The capacitor C1 may include a variable capacitor, and impedance matching may be performed by adjusting the capacitance of the capacitor C1. The equivalent circuit of each of the transmission resonant coil unit 220, the reception resonant coil unit 310 and the reception induction coil unit 320 may be the same as the equivalent circuit shown in FIG. 2.

Figure 3:
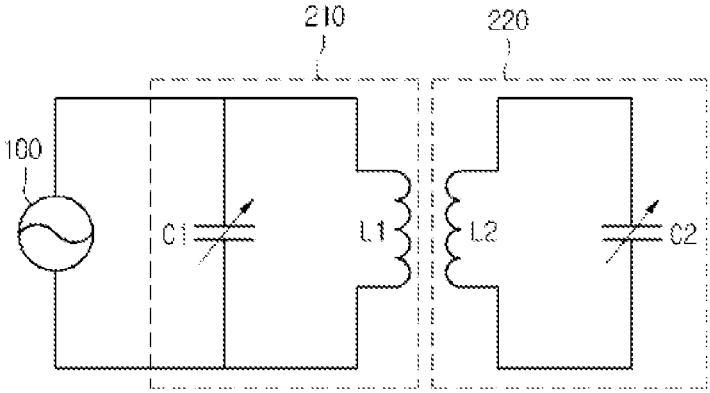
FIG. 3 is a circuit diagram showing an equivalent circuit of a power supply device and a wireless power transmitting apparatus according to one embodiment.

FIG. 3 is a circuit diagram showing an equivalent circuit of the power supply device 100 and the wireless power transmitting apparatus 200 according to one embodiment.

As shown in FIG. 3, the transmission induction coil unit 210 includes the inductor L1 having predetermined inductance and a capacitor C1 having predetermined capacitance. The transmission resonant coil unit 220 includes an inductor L2 having predetermined inductance and a capacitor C2 having predetermined capacitance.

Figure 4:
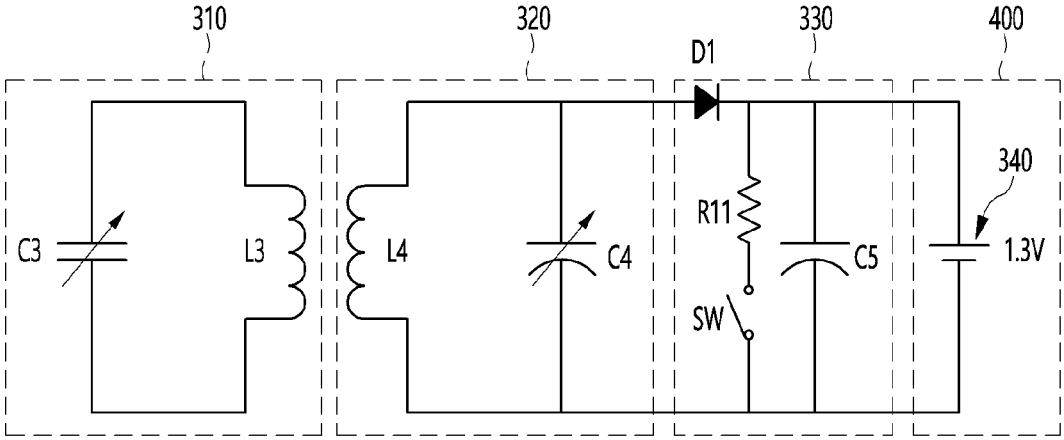
FIG. 4 is a circuit diagram showing an equivalent circuit of a wireless power receiving apparatus according to one embodiment.

FIG. 4 is a circuit diagram showing an equivalent circuit of the wireless power receiving apparatus 300 according to one embodiment.

As shown in FIG. 4, the reception resonant coil unit 310 includes an inductor L3 having predetermined inductance and a capacitor C1 having predetermined capacitance. The reception induction coil unit 320 includes an inductor L4 having predetermined inductance and a capacitor C4 having predetermined capacitance.

The rectifying unit 330 may transfer converted DC power to the load 400 by converting AC power received from the reception induction coil unit 320 into the DC power.

In detail, the rectifying unit 330 may include a rectifier and a smoothing circuit. According to one embodiment, the rectifier may include a silicon rectifier and may be equivalent as a diode D1 as shown in FIG. 4.

The rectifier may convert AC power received from the reception induction coil unit 320 into the DC power.

The smoothing circuit may output smooth DC power by removing AC components from the DC power converted by the rectifier. According to one embodiment, as shown in FIG. 4, the smoothing circuit may include a rectifying capacitor C5, but the embodiment is not limited thereto.

The load 400 may be a predetermined rechargeable battery or a device requiring the DC power. For example, the load 400 may refer to a battery *340*.

The wireless power receiving apparatus 300 may be installed in an electronic device, such as a cellular phone, a laptop computer or a mouse, requiring the power. Accordingly, the reception resonant coil unit 310 and the reception induction coil unit 320 may have the shape suitable to the shape of the electronic device.

The wireless power transmitting apparatus 200 may interchange information with the wireless power receiving apparatus 300 through in-band communication or out-of-band communication.

The in-band communication refers to the communication for interchanging information between the wireless power transmitting apparatus 200 and the wireless power receiving apparatus 300 through a signal having the frequency used in the wireless power transmission. The wireless power receiving apparatus 300 may further include a switch, and may receive or may not receive power transmitted from the wireless power transmitting apparatus 200 through a switching operation of the switch. Accordingly, the wireless power transmitting apparatus 200 can recognize an on-signal or an off-signal of the switch included in the wireless power receiving apparatus 300 by detecting the quantity of power consumed in the wireless power transmitting apparatus 200.

In detail, the wireless power receiving apparatus 300 may change the power consumed in the wireless power transmitting apparatus 200 by adjusting the quantity of power absorbed in a resistor by using the resistor *R11* and the switch *SW*. The wireless power transmitting apparatus 200 may acquire the state information of the wireless power receiving apparatus 300 by detecting the variation of the power consumption. The switch *SW* may be connected to the resistor *R11* in series. According to one embodiment, the state information of the wireless power receiving apparatus 300 may include information about the present charge quantity in the wireless power receiving apparatus 300 and the change of the charge quantity.

In more detail, if the switch is open, the power absorbed in the resistor becomes zero, and the power consumed in the wireless power transmitting apparatus 200 is reduced.

If the switch is short-circuited, the power absorbed in the resistor becomes greater than zero, and the power consumed in the wireless power transmitting apparatus 200 is increased. If the wireless power receiving apparatus repeats the above operation, the wireless power transmitting apparatus 200 detects power consumed therein to make digital communication with the wireless power receiving apparatus 300.

The wireless power transmitting apparatus 200 receives the state information of the wireless power receiving apparatus 300 through the above operation so that the wireless power transmitting apparatus 200 can transmit appropriate power.

On the contrary, the wireless power transmitting apparatus 200 may include a resistor and a switch to transmit the state information of the wireless power transmitting apparatus 200 to the wireless power receiving apparatus 300. According to one embodiment, the state information of the wireless power transmitting apparatus 200 may include information about the maximum quantity of power to be supplied from the wireless power transmitting apparatus 200, the number of wireless power receiving apparatus 300 receiving the power from the wireless power transmitting apparatus 200 and the quantity of available power of the wireless power transmitting apparatus 200.

Hereinafter, the out-of-band communication will be described

The out-of-band communication refers to the communication performed through a specific frequency band other than the resonance frequency band in order to interchange information necessary for the power transmission. The wireless power transmitting apparatus 200 and the wireless power receiving apparatus 300 can be equipped with out-of-band communication modules to interchange information necessary for the power transmission. The out-of-band communication module may be installed in the power supply device. In one embodiment, the out-of-band communication module may use a short-distance communication technology, such as Bluetooth, Zigbee, WLAN or NFC, but the embodiment is not limited thereto.

Hereinafter, the power supply device 100 according to one embodiment will be described with reference to FIGS. 5 to 10.

Figure 5:
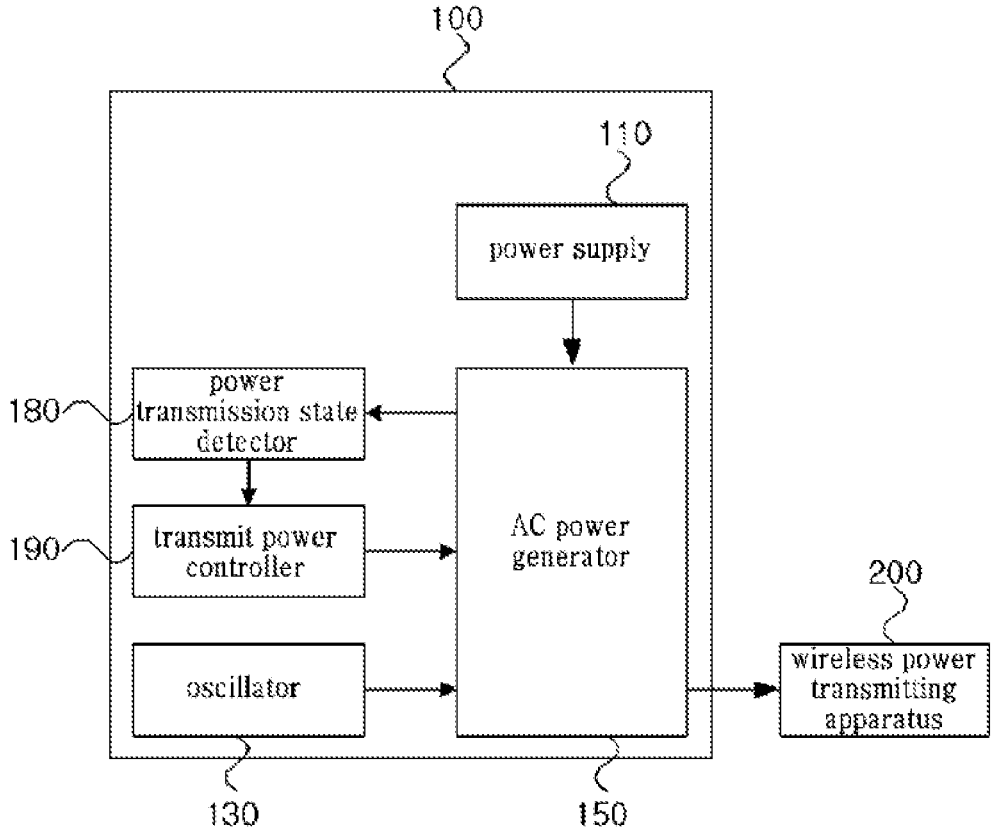
FIG. 5 is a block diagram showing the power supply device according to one embodiment.

FIG. 5 is a block diagram showing the power supply device 100 according to one embodiment.

As shown in FIG. 5, the power supply device 100 according to one embodiment includes a power supply 110, an oscillator 130, an AC power generator 150, a power transmission state detector 180, and a transmit power controller 190. In addition, the power supply device 100 is connected with the wireless power transmitting apparatus 200.

The power supply 110 generates DC power having DC voltage and outputs the DC power through an output terminal thereof.

The oscillator 130 generates a lower-power sine wave signal.

The power transmission state detector 180 detects a wireless power transmission state between the wireless power transmitting apparatus 200 and the wireless power transmitting apparatus 300.

The transmit power controller 190 generates a control signal to control the AC power generator 150 based on the detected wireless power transmission state.

The AC power generator 150 generates an AC power. At this time, the AC power can have various waveforms such as a rectangular-waveform, sinusoidal-waveform, or etc. In particular, the AC power generator 150 generates AC power having rectangular-waveform voltage by amplifying the lower-power sine wave signal of the oscillator 130 using DC power of the power supply 110 based on the control signal of the transmit power controller 190.

The wireless power transmitting apparatus 200 transmits the output power of the AC power generator 150 to the wireless power receiving apparatus 300 by resonance.

Figure 6:
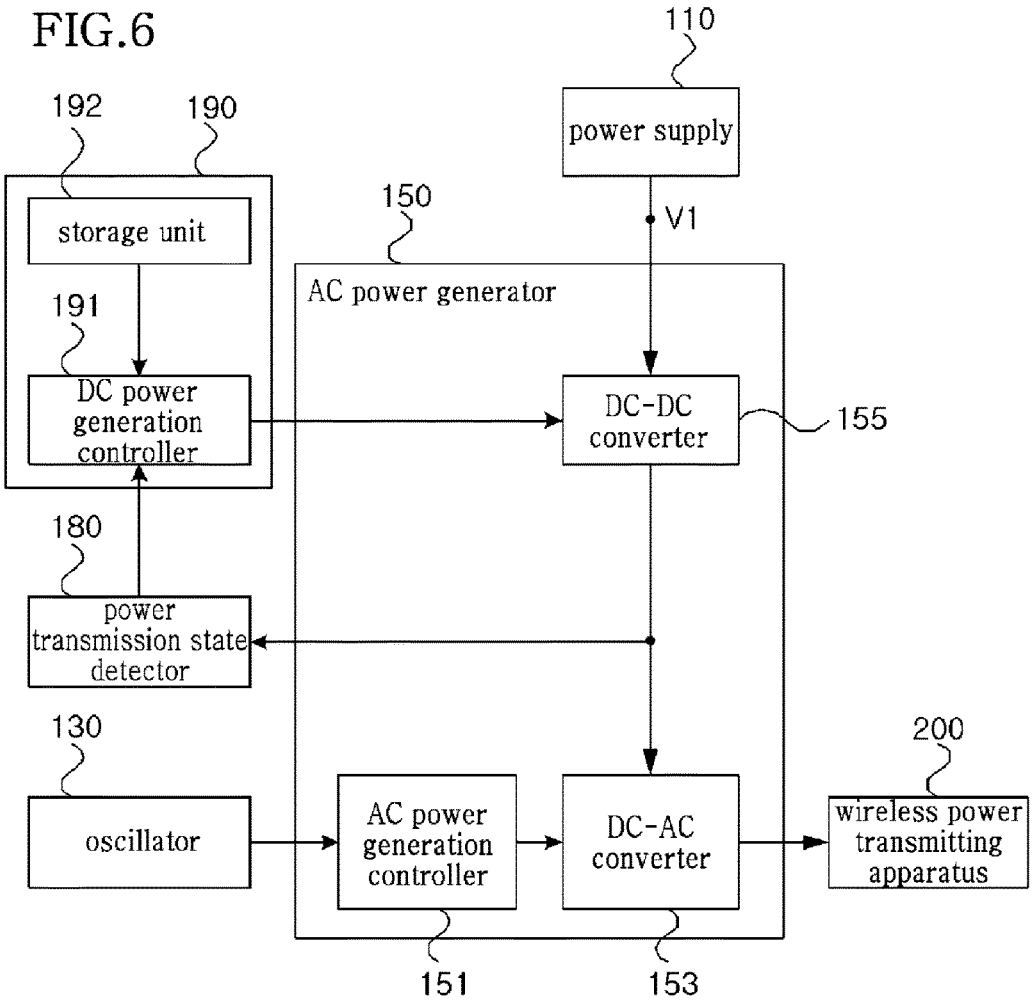
FIG. 6 is a block diagram showing an AC power generator and a transmit power controller according to one embodiment.

FIG. 6 is a block diagram showing the AC power generator 150 and the transmit power controller 190 according to one embodiment.

As shown in FIG. 6, the AC power generator 150 according to one embodiment includes AC power generation controller 151, a DC-AC converter 153, and a DC-DC converter 155, and the transmit power controller 190 includes a DC power generation controller 191 and a storage unit 192.

The AC power generation controller 151 generates an AC power generation control signal based on the lower-power sine wave signal of the oscillator 130.

The DC power generation controller 191 generates a DC power generation control signal based on the detected wireless power transmission state so that the DC-DC converter 155 may output power having output current in a target current range and target DC voltage.

The storage unit 192 stores a look-up table.

The DC-DC converter 155 converts the output power of the power supply 110 into DC power, which has output current in the target current range and the target DC voltage, based on the DC power generation control signal.

The DC-AC converter 153 converts the output power of the DC-DC converter 155 into AC power having the rectangular-waveform AC voltage based on the AC power generation control signal, and outputs the power to the transmission induction coil unit 210.

Figure 7:
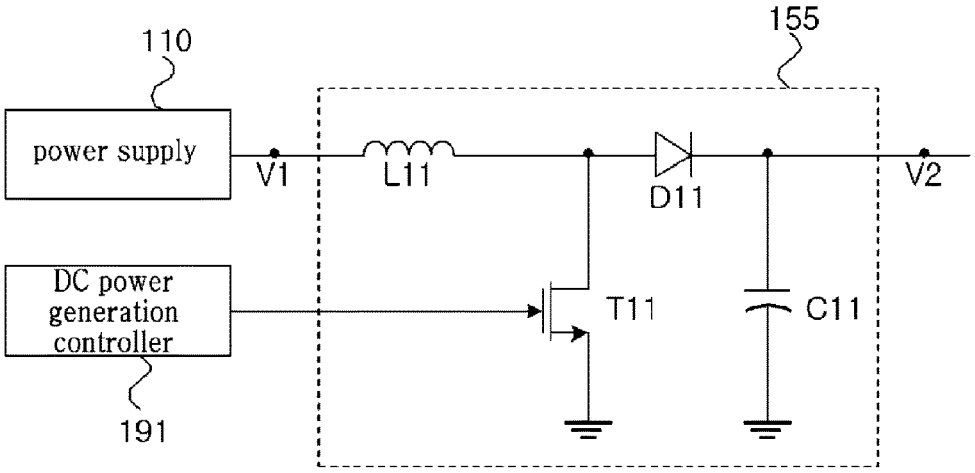
FIG. 7 is a circuit diagram showing a DC-DC converter according to one embodiment.

FIG. 7 is a circuit diagram showing the DC-DC converter 155 according to one embodiment.

As shown in FIG. 7, the DC-DC converter 155 includes an inductor L11, a power switch T11, a diode DK and a capacitor C11. The power switch T11 may be realized by using a transistor. In particular, the power switch T11 may include an n-channel metal-oxide-semiconductor field-effect transistor (NMOSFET), but may be substituted with another device performing the same function.

One terminal of the inductor L11 is connected with an output terminal of the power supply 110, and an opposite terminal of the inductor L11 is connected with a drain electrode of the power switch T11.

The gate electrode of the power switch T11 is connected with an output terminal of the DC power generation controller 191, and a source electrode of the power switch T11 is connected with the ground.

An anode electrode of the diode D11 is connected with the drain electrode of the power switch T11.

One terminal of the capacitor C11 is connected with the cathode electrode of the diode DK and an opposite terminal of the capacitor C11 is connected with the ground.

Figure 8:
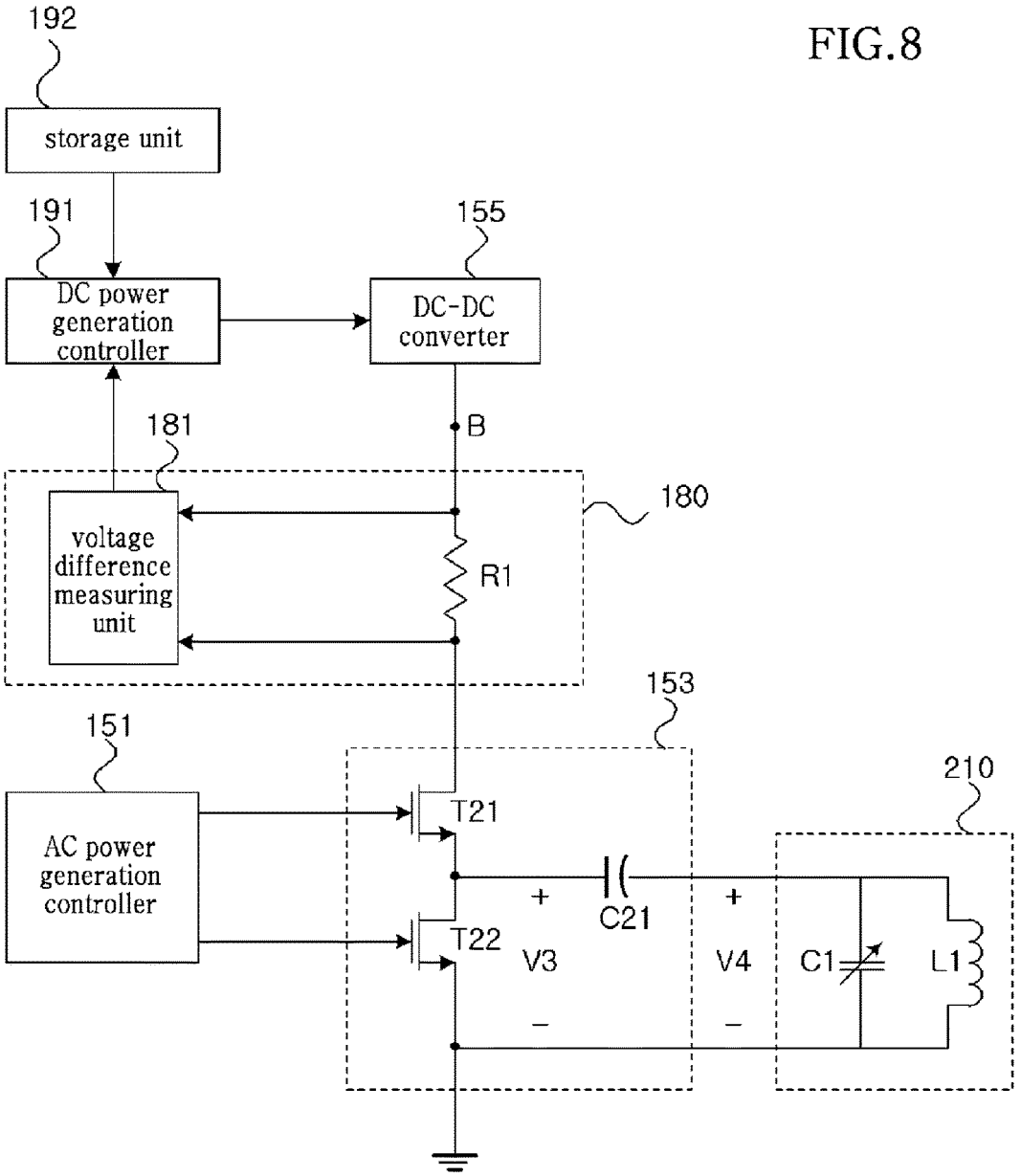
FIG. 8 is a circuit diagram showing the DC-AC converter and the power transmission state detector according to one embodiment.

FIG. 8 is a circuit diagram showing the DC-AC converter 153 and the power transmission state detector 180 according to one embodiment.

As shown in FIG. 8, the DC-AC converter 153 includes a transistor circuit unit having a half-bridge structure. The half-bridge transistor circuit includes an upper transistor T21, a lower transistor T22, and a DC cut-off capacitor C21, and is connected to the AC power generation controller 151 and the transmission induction coil unit 210. The power transmission state detector 180 includes a resistor R1 and a voltage difference measuring unit 181, and is connected with the DC-DC converter 155, the DC-AC converter 153, and the DC power generation controller 191. The DC-AC converter 153 is connected with the DC-DC converter 155 through the resistor R1. The upper and lower transistors T21 and T22 may include n-channel metal-oxide-semiconductor field-effect transistor (NMOS), but may be substituted with another device performing the same function.

The AC power generation controller 151 has an output terminal for an upper transistor control signal and an output terminal for a lower transistor control signal, and outputs the AC power generation control signal based on the lower-power sine wave signal. The AC power generation controller 151 generates the upper transistor control signal as the AC power generation control signal based on the lower-power sine wave signal of the oscillator 130, and outputs the upper transistor control signal through the output terminal for the upper transistor control signal. The AC power generation controller 151 generates the lower transistor control signal as the AC power generation control signal based on the lower-power sine wave signal of the oscillator 130, and outputs the lower transistor control signal through the output terminal for the lower transistor control signal.

A drain electrode of the upper transistor T21 is connected with one terminal of the resistor R1, and the gate electrode is connected with the output terminal for the upper transistor control signal of the AC power generation controller 151.

A drain electrode of the lower transistor T22 is connected with a source electrode of the upper transistor T21, a gate electrode of the lower transistor T22 is connected with the output terminal for the lower transistor control signal of the AC power generation controller 151, and a source electrode of the lower transistor T22 is connected with the ground.

One terminal of the DC cut-off capacitor C21 is connected with the source electrode of the upper transistor T21, and an opposite terminal of the DC cut-off capacitor C21 is connected with one terminal of the inductor L1. An opposite terminal of the inductor L1 is connected with the ground.

The voltage difference measuring unit 181 measures the difference between voltages applied to both terminals of the resistor R1.

Hereinafter, a wireless power transmitting method according to one embodiment will be described with reference to FIGS. 9 and 10.

Figure 9:
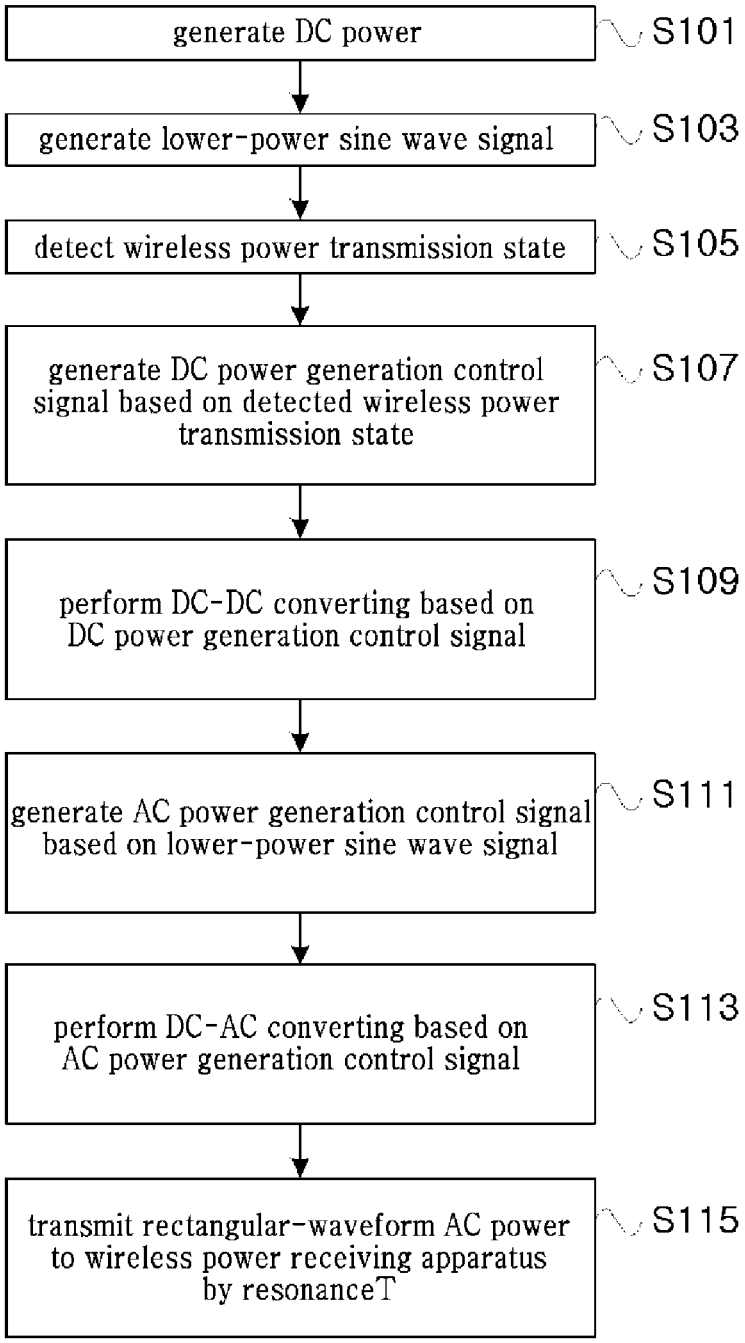
FIG. 9 is a flowchart showing a wireless power transmitting method according to one embodiment
Figure 10:
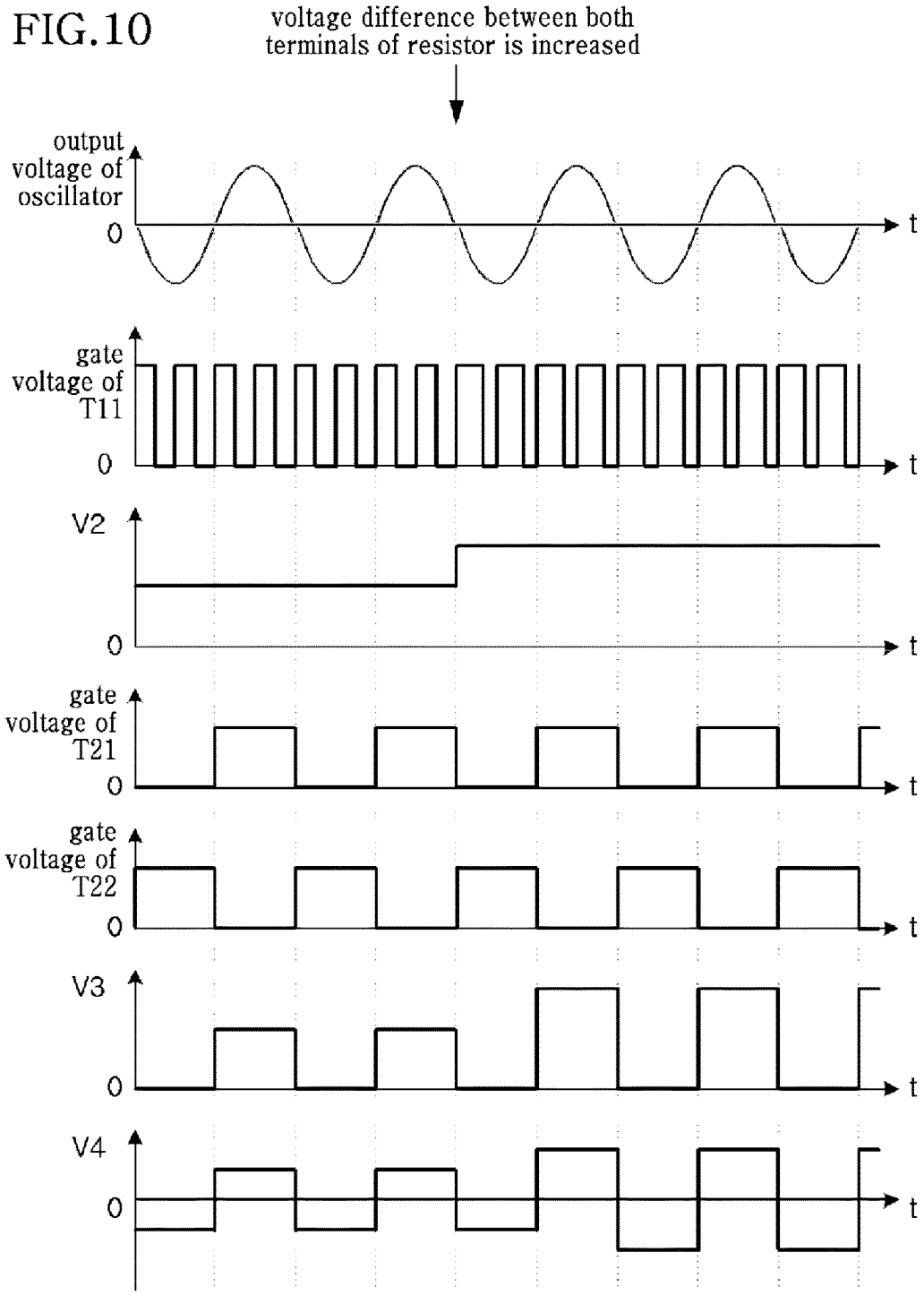
FIG. 10 shows waveforms of voltage at each node in the power supply device according to one embodiment.

FIG. 9 is a flowchart showing the wireless power transmitting method according to one embodiment, and FIG. 10 shows waveforms of voltage at each node in the power supply device 100 according to one embodiment.

In particular, FIG. 9 shows the wireless power transmitting method to explain the embodiments of FIGS. 6 to 8 in detail.

The power supply 110 generates DC power having DC voltage (step S101). In particular, the power supply 110 may convert AC power having AC voltage into the DC power having DC voltage.

The oscillator 130 generates the lower-power sine wave signal (step S103).

The power transmission state detector 180 detects the wireless power transmission state (step S105). The power transmission state detector 180 may detect the wireless power transmission state based on the level of the output current of the DC-DC converter 155. Since the voltages applied to the both terminal of the resistor R1 are proportional to the level of the output current of the DC-DC converter 155, the voltage difference measuring unit 181 of the power transmission state detector 180 may detect the wireless power transmission state based on the different between the voltages applied to both terminals of the resistor R1.

Since the coupling coefficient varies depending on the distance between the wireless power transmitting apparatus 200 and the wireless power reception apparatus 300 or the relatively positions thereof, the wireless power transmission state may be changed. In other words, as the distance between the distance between the wireless power transmitting apparatus 200 and the wireless power reception apparatus 300 is increased, the coupling coefficient is reduced, so that the wireless power transmission state may be degraded. As the wireless power transmission state becomes degraded, even if the wireless power transmitting apparatus 200 transmits power having the same intensity to the wireless power receiving apparatus 300, greater power is consumed due to the inferior transmission efficiency. Therefore, the power transmission state detector 180 may detect the wireless power transmission state based on the level of the output current of the DC-DC converter 155.

Since the output current of the DC-DC converter 155 may not be constantly maintained, the power transmission state detector 180 may measure the peak-to-peak value of the output current of the DC-DC converter 155.

The DC power generation controller 191 generates a DC power generation control signal based on the detected wireless power transmission state so that the DC-DC converter 155 may output DC power having output current in a target current range and target DC voltage (step S107), and outputs the DC power generation control signal to the gate electrode of the transistor T11. In this case, the target current range may have a constant value regardless of the level of the target DC voltage, or may vary depending on the level of the target DC voltage. In addition, the target current range may be the range of the peak-to-peak value of the target current. As shown in FIG. 10, the DC power generation control signal may be a pulse width modulation (PWM) signal continuously represented throughout the whole duration. The DC power generation controller 191 may determine a duty ratio of the PWM signal based on the detected wireless power transmission state.

According to one embodiment, the voltage difference measuring unit 181 obtains a measurement output current value based on the difference between voltages applied to both terminals of the resistor R1. Thereafter, if the measurement output current value gets out of the reference range, the DC power generation controller 191 changes the duty rate, and outputs the DC power generation control signal serving as the PWM signal having the changed duty rate to the gate electrode of the transistor T11 so that the output current value of the DC-DC converter 155 becomes in the reference range. In detail, if the measurement output current value is greater than the upper limit of the reference range, the DC power generation controller 191 reduces the duty rate and outputs the DC power generation control signal serving as the PWM signal having the reduced duty rate to the gate electrode of the transistor T11 so that the output current value of the DC-DC converter 155 becomes in the reference range. Further, if the measurement output current value is smaller than the lower limit of the reference range, the DC power generation controller 191 increases the duty rate and outputs the DC power generation control signal serving as the PWM signal having the increased duty rate to the gate electrode of the transistor T11 so that the output current value of the DC-DC converter 155 becomes in the reference range.

According to another embodiment, the storage unit 192 may have a look-up table representing the relationship between a plurality of measurement output power values and a plurality of target output voltage values. Table 1 shows the look-up table representing the relationship between the measurement output power values and the target output voltage values according to one embodiment.

TABLE 1

| Measurement Output Power | Target Output Voltage |
|---|---|
| 10 W or less | 12 V |
| 10~12 W | 14 V |
| 12~14 W | 16 V |
| 14~16 W | 18 V |
| 16~18 W | 20 V |
| 18~20 W | 22 V |
| 20 W or more | 24 |

In this case, the voltage difference measuring unit 181 obtains a measurement output current value based on the difference between voltages applied to both terminals of the resistor R1. Thereafter, the DC power generation controller 191 obtains a measurement output power value of present output power of the DC-DC converter 155 based on the measurement output current value, and searches for a target output voltage value corresponding to the measurement output power value in the look-up table. Then, the duty rate of the PWM signal is determined using the voltage of the node B as feed-back information so that the output voltage of the DC-DC converter 155 may have the target output voltage value, and the DC power generation control signal may be generated based on the duty rate.

According to another embodiment, the storage unit 192 may have a look-up table representing the relationship between a plurality of measurement output current values and a plurality of target output voltage values. In this case, the voltage difference measuring unit 181 obtains a measurement output current value based on the difference between voltages applied to both terminals of the resistor R1. Thereafter, the DC power generation controller 191 searches for a target output voltage value corresponding to the measurement output current value in the look-up table. Then, the duty rate of the PWM signal is determined using the voltage of the node B as feed-back information so that the output voltage of the DC-DC converter 155 may have the target output voltage value, and the DC power generation control signal may be generated based on the duty rate.

Table 2 shows a look-up table according to one embodiment.

TABLE 2

| Measurement output current at initial output voltage | Coupling coefficient | Target output voltage | Desirable current range |
|---|---|---|---|
| 100 mA or less | 0.03 or less | 30 V | 801~851 mA |
| 101~150 mA | 0.05 | 28 V | 751~800 mA |
| 151~200 mA | 0.08 | 26 V | 701~751 mA |
| 201~250 mA | 0.11 | 24 V | 651~700 mA |
| 251~300 mA | 0.14 | 22 V | 601~650 mA |
| 301~350 mA | 0.17 | 20 V | 551~600 mA |
| 351 mA or more | 0.20 or more | 18 V | 501~550 mA |

As shown in table 2, the storage unit 192 may have a look-up table corresponding to an output current value of the DC-DC converter 155, a coupling coefficient, an output voltage value of the DC-DC converter 155, and a desirable current range.

If the level of the output current of the DC-DC converter 155 is 100 mA or more when the DC-DC converter 155 outputs DC power having an initial output voltage value, the wireless power receiving apparatus 300 may be regarded as being detected. The initial output voltage may be 12V which is given for the illustrative purpose.

If the level of the output current of the DC-DC converter 155 is 120 mA when the DC-DC converter 155 outputs the DC power having the initial output voltage value, the coupling coefficient between the transmission resonance coil unit 220 of the wireless power transmitting apparatus 200 and the reception resonance coil unit 310 of the wireless power receiving apparatus 300 corresponds to 0.05. In this case, the DC power generation controller 191 determines the wireless power receiving apparatus 300 as being apart from the wireless power transmitting apparatus 200 and controls the DC-DC converter 155 to have the output voltage of 28V.

Thereafter, when the level of the output voltage of the DC-DC converter 155 is maintained at 28V, the DC power generation controller 191 determines if the level of the output current of the DC-DC converter 155 is in a desirable current range of 751 mA to 800 mA.

If the level of the output current of the DC-DC converter 155 is out of the desirable current range, the DC power generation controller 191 controls the DC-DC converter 155 so that the level of the output voltage of the DC-DC converter 155 is the level (12V) of the initial output voltage. If the level of the output current of the DC-DC converter 155 is 180 mA, the controller 270 determines the wireless power transmitting apparatus 200 as being closer to the wireless power receiving apparatus 300 when comparing with the case that the level of the output current of the DC-DC converter 155 is 120 mA. Accordingly, the controller 270 controls the DC-DC converter 155 such that the level of the output voltage of the DC-DC converter 155 is 26V.

Although the above example has been described in that the distance between the wireless power transmitting apparatus 200 and the wireless power receiving apparatus 300 is related to the intensity of current, various wireless power states such as a direction in which the wireless power transmitting apparatus 200 and the wireless power receiving apparatus 300 are placed may be considered.

As described above, the wireless power transmitting apparatus 200 adjusts power transmitted to the wireless power receiving apparatus 300 based on the various wireless power transmission states such as the distance from the wireless power receiving apparatus 300 and the direction in which the wireless power receiving apparatus 300 is placed, thereby maximizing the power transmission efficiency, and presenting the power loss.

The DC-DC converter 155 converts the output power of the power supply 110 into the DC power having the output current in the target current range and the target DC voltage based on the DC power generation control signal (step S109). The level of the output voltage of the DC-DC converter 155 may be equal to that of the output voltage of the power supply 110, or greater than or smaller than that of the output voltage of the power supply 110.

The AC power generation controller 151 generates an AC power generation control signal based on the sin-wave lower power of the oscillator 130 (step S111). The AC power generation controller 151 may generate the upper transistor control signal serving as the AC power generation control signal based on the sin-wave lower power of the oscillator 130, and may output the upper transistor control signal through the output terminal for the upper transistor control signal. The AC power generation controller 151 may generate the lower transistor control signal serving as the AC power generation control signal based on the sin-wave lower power of the oscillator 130, and may output the lower transistor control signal through the output terminal for the lower transistor control signal.

Hereinafter, the upper and lower transistor control signals will be described with reference to FIG. 10.

As shown in FIG. 10, the upper and lower transistor control signals have the rectangular waveform.

One period of the upper transistor control signal sequentially includes a turn-on time slot of the upper transistor T21 and a turn-off time slot of the upper transistor T21. The turn-on time slot of the upper transistor T21 may correspond to one half period of the lower-power sine wave signal of the oscillator 130, and the turn-off time slot of the upper transistor T21 may correspond to the other half period of the lower-power sine wave signal.

One period of the lower transistor control signal sequentially includes a turn-on time slot of the lower transistor T22 and a turn-off time slot of the lower transistor T22. The turn-on time slot of the lower transistor T22 may correspond to one half period of the lower-power sine wave signal of the oscillator 130, and the turn-off time slot of the lower transistor T22 may correspond to the other half period of the lower-power sine wave signal.

The upper transistor control signal has a level to turn on the upper transistor T21 during the turn-on time slot of the upper transistor T21. The level to turn on the upper transistor T21 may be a high level.

During the turn-off time slot of the upper transistor T21, the upper transistor control signal has a level to turn off the upper transistor T21. The level to turn off the upper transistor T21 may be a low level.

During the turn-on time slot of the lower transistor T22, the lower transistor control signal has a level to turn on the lower transistor T22. The level to turn on the lower transistor T22 may be a high level.

During the turn-off time slot of the lower transistor T22, the lower transistor control signal has a level to turn off the lower transistor T22. The level to turn off the lower transistor T22 may be a low level.

During the turn-on time slot of the upper transistor T21, the lower transistor control signal has the level to turn off the lower transistor T22 during the turn-off time slot of the lower transistor T22.

During the turn-on time slot of the lower transistor T22, the lower transistor control signal has the level to turn off the lower transistor T22 during the turn-off time slot of the upper transistor T21.

In order to inhibit a short circuit occurring by simultaneously turning on the upper and the lower transistors T21 and T22, the upper and lower transistor control signals may have a dead time slot.

In order to output power of voltage provided in a rectangular waveform having the duty cycle of 50%, the turn-on time slot of the upper transistor T21 has a duration corresponding to (50–a) % of one period (T), and the dead time slot of the upper transistor T21 has the duration of a % of one period (T). The turn-off time slot of the upper transistor T21 may have a duration corresponding to 50% of one period (T), the turn-on time slot of the lower transistor T22 may have a duration corresponding to (50–a) % of one period (T), the dead time slot of the lower transistor T22 may have a duration corresponding to a % of one period (T), and the turn-off time slot of the lower transistor T22 may have a duration corresponding to 50% of one period (T). For example, "a" may be 1%.

The DC-AC converter 153 converts the output power of the DC-DC converter 155 into AC power having rectangular-waveform AC voltage based on the AC power generation control signal (step S113) and outputs the AC power to the transmission induction coil unit 210. Hereinafter, the operation of the DC-AC converter 153 will be described with reference to FIG. 10.

The upper and lower transistors T21 and T22 output rectangular-waveform power having rectangular-waveform voltage V3 shown in FIG. 10 according to the upper and lower transistor control signals having the dead time slot.

The DC cut-off capacitor C21 cuts off DC voltage of the rectangular-waveform power and outputs the rectangular-waveform power having the rectangular-waveform AC voltage V4 to the transmission induction coil unit 210.

The wireless power transmitting apparatus 200 transmits the rectangular-waveform AC power having the rectangular-waveform AC voltage to the wireless power receiving apparatus 300 by resonance (step S115).

Hereinafter, a power supply device 100 according to another embodiment will be described with reference to FIGS. 11 to 15.

Figure 11:
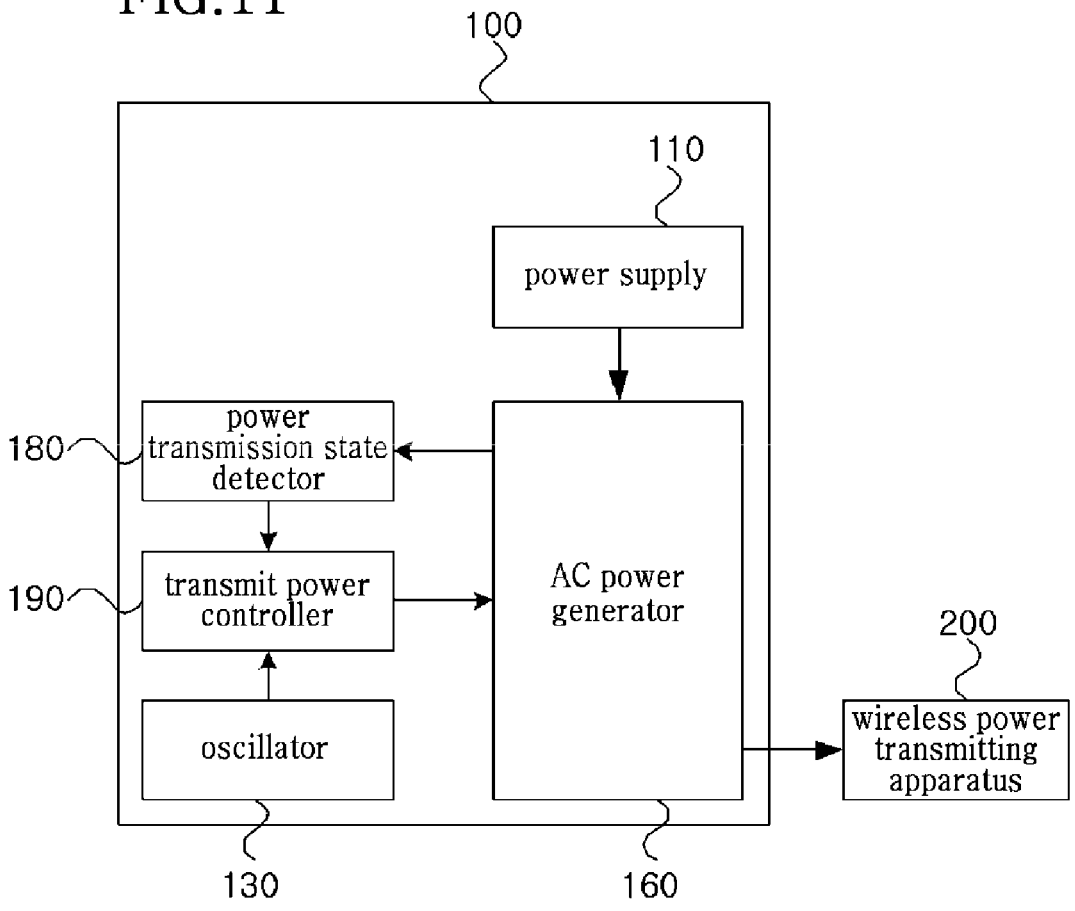
FIG. 11 is a block diagram showing a power supply device according to another embodiment.

FIG. 11 is a block diagram showing the power supply device 100 according to another embodiment.

As shown in FIG. 11, the power supply device 100 according to another embodiment includes the power supply 110, the oscillator 130, an AC power generator 160, the power transmission state detector 180, and the transmit power controller 190. In addition, the power supply device 100 is connected with the wireless power transmitting apparatus 200.

The power supply 110 generates DC power having DC voltage and outputs the DC power through an output terminal thereof.

The oscillator 130 generates a lower-power sine wave signal.

The power transmission state detector 180 detects the wireless power transmission state.

The transmit power controller 190 generates a control signal to control the AC power generator 160 based on the detected wireless power transmission state and the lower-power sine wave signal of the oscillator 130.

The AC power generator 160 generates AC power having rectangular-waveform voltage by amplifying the lower-power sine wave signal of the oscillator 130 using DC power of the power supply 110 based on the control signal of the transmit power controller 190.

The wireless power transmitting apparatus 200 transmits the output power of the AC power generator 160 to the wireless power receiving apparatus 300 by resonance.

Figure 12:
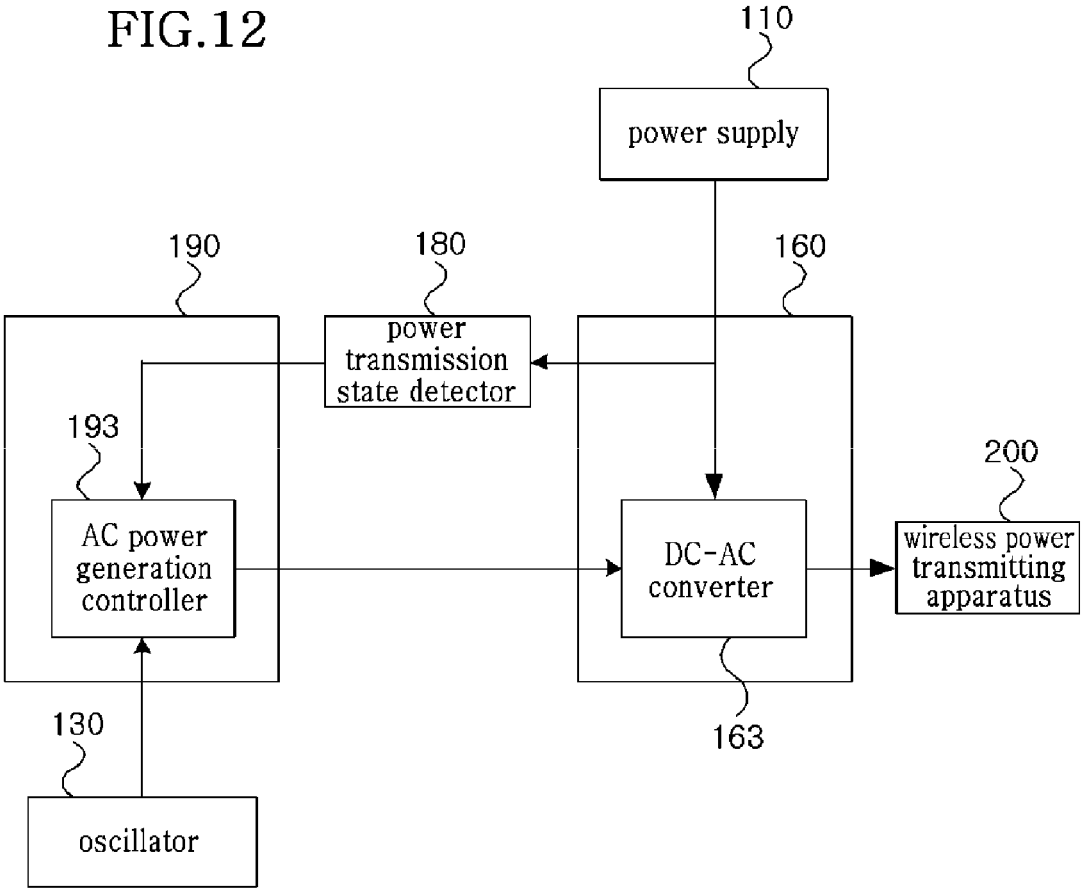
FIG. 12 is a block diagram showing an AC power generator and a transmit power controller according to another embodiment.

FIG. 12 is a block diagram showing the AC power generator 160 and the transmit power controller 190 according to another embodiment.

As shown in FIG. 12, the AC power generator 160 according to another embodiment includes a DC-AC converter 163, and the transmit power controller 190 includes an AC power generation controller 193.

The AC power generation controller 193 generates an AC power generation control signal based on the lower-power sine wave signal of the oscillator 130. In addition, the AC power generation controller 193 may generate the AC power generation control signal, which allows the power supply 110 to output DC power having output current in a target current range, based on the detected wireless power transmission state. The target current range may be the range of the peak-to-peak value of the target current.

The DC-AC converter 163 converts the output power of the power supply 110 into AC power having rectangular-waveform AC voltage based on the AC power generation control signal, and outputs the AC power to the transmission induction coil unit 210.

Figure 13:
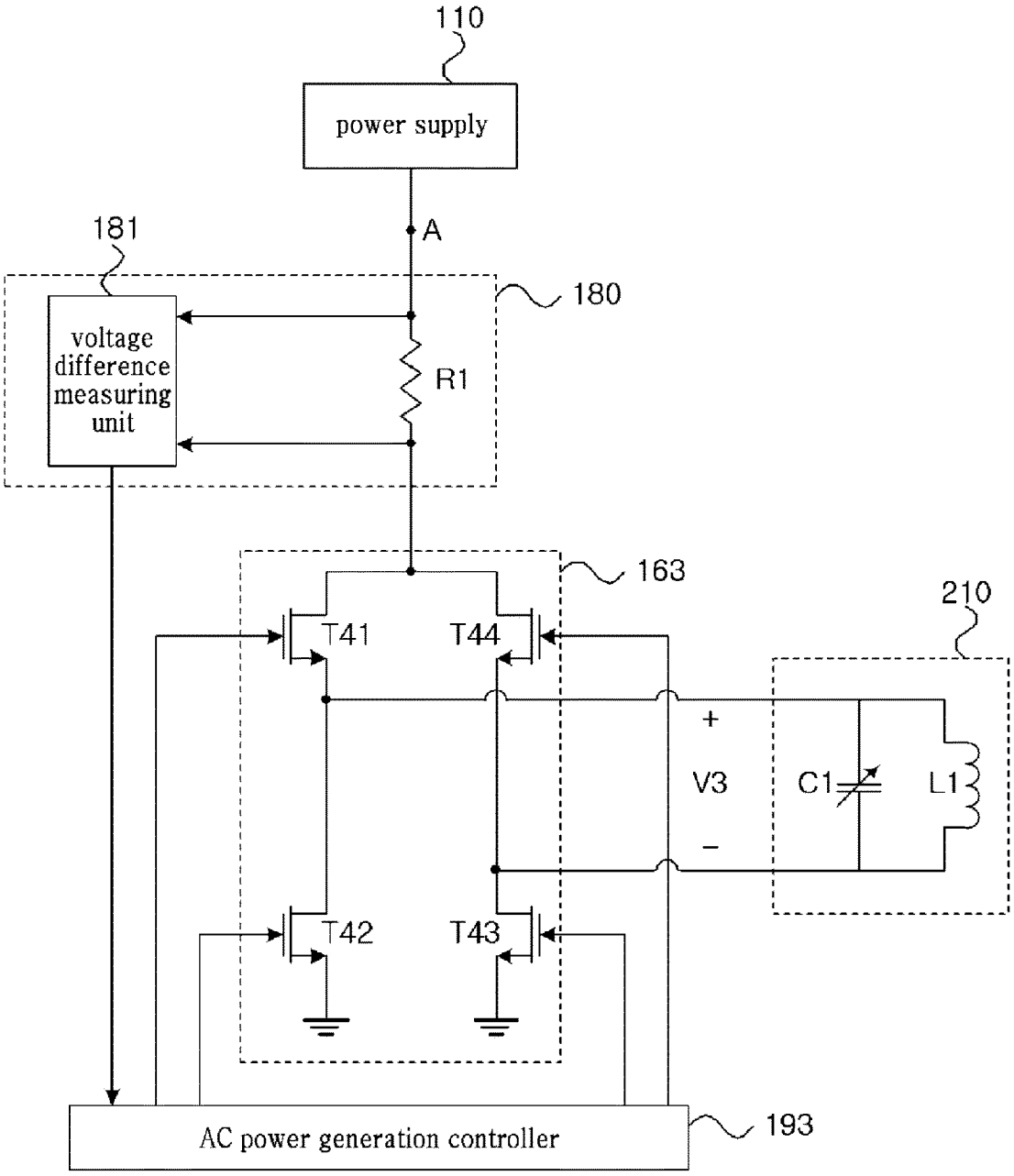
FIG. 13 is a circuit diagram showing a DC-AC converter and a power transmission state detector according to another embodiment.

FIG. 13 is a circuit diagram showing the DC-AC converter 163 and the power transmission state detector 180.

As shown in FIG. 13, the DC-AC converter 163 includes a full-bridge transistor circuit unit. The full-bridge transistor circuit unit includes two half-bridge transistor circuits. One of the two half-bridge transistor circuits includes upper and lower transistors T41 and T42, and the other includes upper and lower transistors T44 and T43. The upper transistors T41 and T44, and the lower transistors T42 and T43 may be n-channel metal-oxide-semiconductor field-effect transistors (NMOS-FETs), and may be substituted with different devices performing the same operation.

The power transmission state detector 180 includes a resistor R1 and the voltage difference measuring unit 181, and is connected to the power supply 110, the DC-AC converter 163, and the AC power generation controller 193. The DC-AC converter 163 is connected to the power supply 110 through the resistor R1.

The AC power generation controller 193 has first and second upper transistor control signal output terminals and first and second lower transistor control signal output terminals, and generates an AC power generation control signal based on the lower-power sine wave signal of the oscillator 130 and a wireless power transmission state.

A drain electrode of the upper transistor T41 is connected with one terminal of the resistor R1, a gate electrode of the upper transistor T41 is connected with the first upper transistor control signal output terminal of the AC power generation controller 193, and a source electrode of the upper transistor T41 is connected with one terminal of the inductor L1.

A drain electrode of the lower transistor T42 is connected with the source electrode of the upper transistor T41, a gate electrode of the lower transistor T42 is connected to the first lower transistor control signal output terminal of the AC power generation controller 193, and a source electrode of the lower transistor T42 is connected with the ground.

A drain electrode of the upper transistor T44 is connected with one terminal of the resistor R1, a gate electrode of the upper transistor T44 is connected with the second upper transistor control signal output terminal of the AC power generation controller 193, and a source electrode of the upper transistor T44 is connected with an opposite terminal of the inductor L1.

A drain electrode of the lower transistor T43 is connected with the source electrode of the upper transistor T44, a gate electrode of the lower transistor T43 is connected to the second lower transistor control signal output terminal of the AC power generation controller 193, and a source electrode of the lower transistor T43 is connected with the ground.

The voltage difference measuring unit 181 measures the difference between voltages applied to both terminals of the resistor R1.

Hereinafter, a wireless power transmitting method will be described with reference to FIGS. 14 and 15 according to another embodiment.

Figure 14:
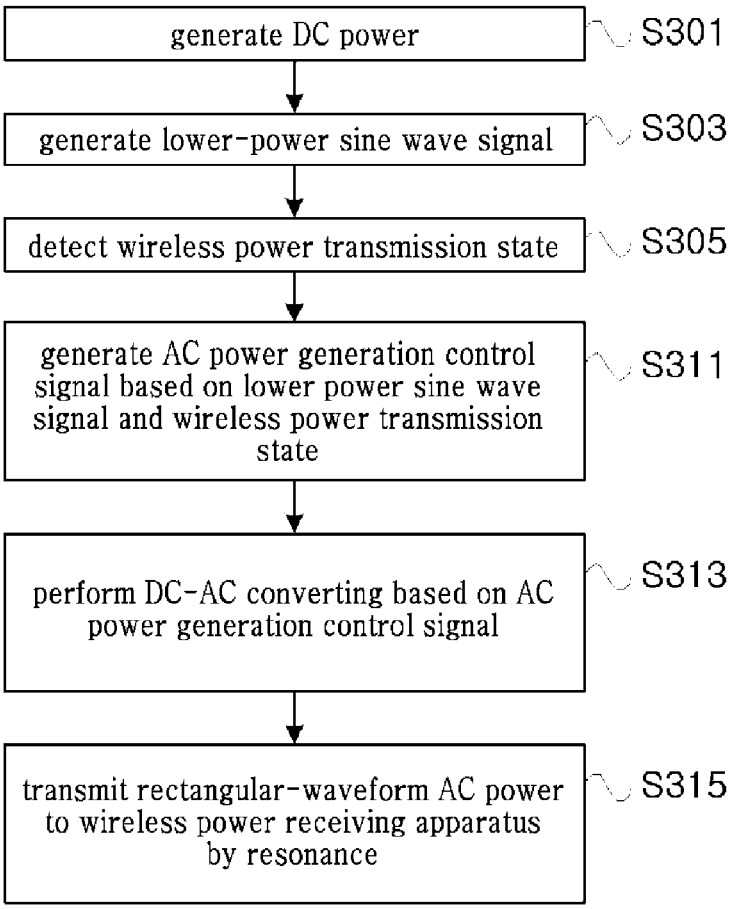
FIG. 14 is a flowchart showing a wireless power transmitting method according to another embodiment
Figure 15:
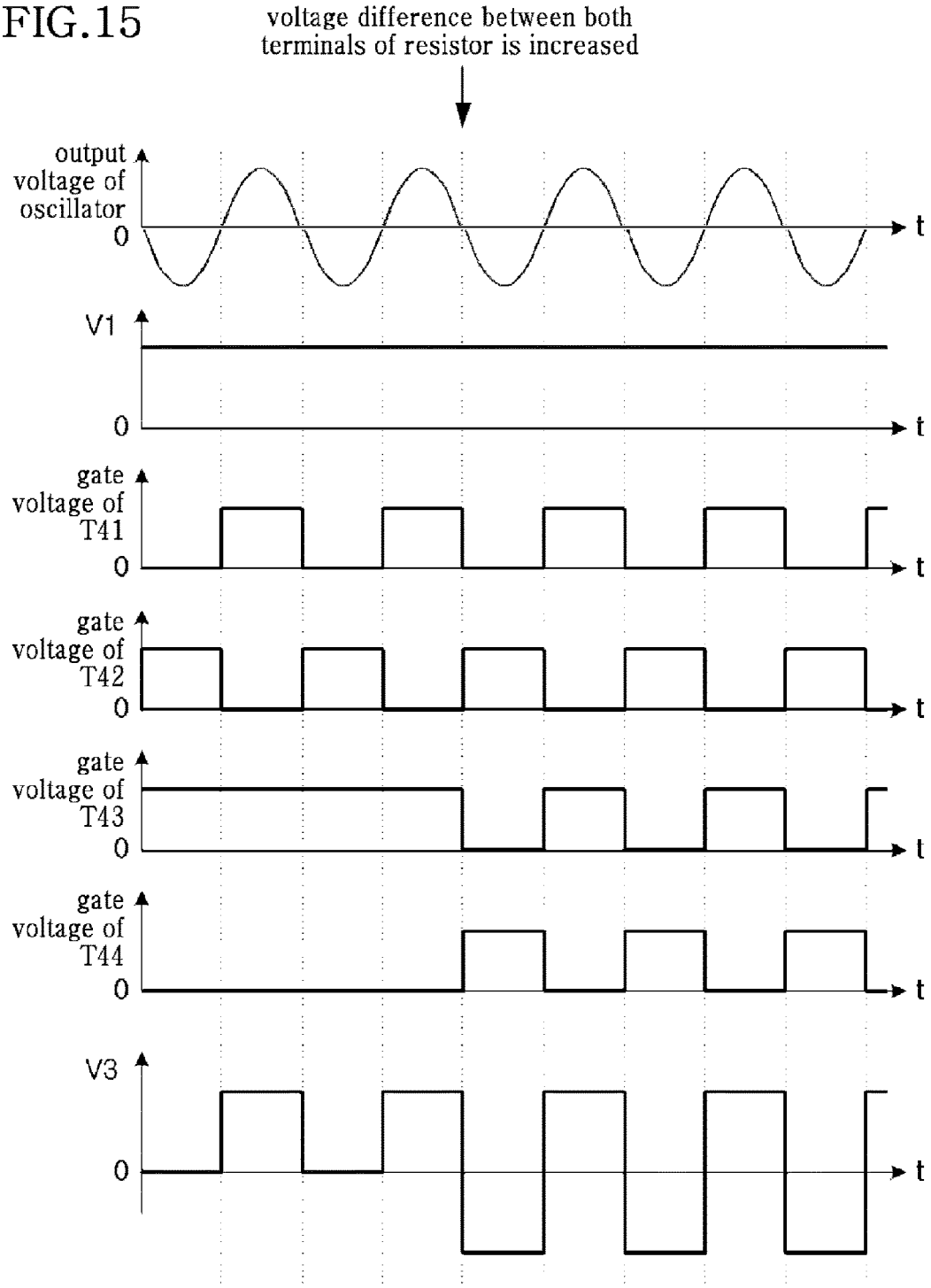
FIG. 15 shows waveforms of voltage at each node in the power supply device according to another embodiment.

FIG. 14 is a flowchart showing the wireless power transmitting method according to another embodiment, and FIG. 15 shows waveforms of voltage at each node in the power supply device 100 according to another embodiment.

In particular, FIG. 14 shows the wireless power transmitting method to explain the embodiments of FIGS. 11 to 13 in detail.

The power supply 110 generates DC power having DC voltage (step S301). In particular, the power supply 110 may convert AC power having AC voltage into the DC power having DC voltage.

The oscillator 130 generates a lower-power sine wave signal (step S303).

The power transmission state detector 180 detects the wireless power transmission state (step S305). The power transmission state detector 180 may detect the wireless power transmission state based on the level of the output current of the power supply HO. Since the voltages applied to the both terminal of the resistor R1 are proportional to the level of the output current of the power supply 110, the voltage difference measuring unit 181 of the power transmission state detector 180 may detect the wireless power transmission state based on the different between the voltages applied to both terminals of the resistor R1. Since the output current of the power supply 110 may not be constantly maintained, the power transmission state detector 180 may measure the wireless power transmission state based on the peak-to-peak level of the output current of the power supply 110.

The AC power generation controller 193 generates the AC power generation control signal allowing the power supply 110 to output DC power having the output current in the target current range, based on the detected wireless power transmission state (step S311), and outputs the generates the AC power generation control signal to the DC-AC converter 163. Since the output current of the power supply 110 may not be constantly maintained, the power transmission state detector 180 may measure the peak-to-peak level of the output current of the power supply 110.

According to one embodiment, the AC power generation controller 193 may determine an operating mode of the DC-AC converter 163 based on the detected wireless power transmission state, and may output the AC power generation control signal for the operating mode to the DC-AC converter 163. In this case, the operating mode may be one of a full-bridge operating mode and a half-bridge operating mode. The voltage difference measuring unit 181 obtains a measurement output current value based on the difference between voltages applied to both terminals of the resistor R1. The DC power generation controller 191 may compare the measurement output current value with a reference value and determine the operating mode of the DC-AC converter 163 according to the comparison result. In this case, the reference value may be in the desirable current range of table 2 set according to the initial output voltage values. If the measurement output current value is greater than the reference value, the DC power generation controller 191 may determine the operating mode of the DC-AC converter 163 as the full-bridge operating mode. If the measurement output current value is smaller than the reference value, the DC power generation controller 191 may determine the operating mode of the DC-AC converter 163 as the half-bridge operating mode.

At the half-bridge operating mode, the AC power generation controller 193 operates one of two half-bridge transistor circuits, and stops the operation of the other. The AC power generation controller 193 turns off the upper transistor of the half-bridge transistor circuit, the operation of which is stopped, and turns on the lower transistor of the half-bridge transistor circuit. The AC power generation controller 193 applies a control signal to the half-bridge transistor circuit, the operation of which is allowed, as described with reference to FIG. 10.

At the full-bridge operating mode, the AC power generation controller 193 alternately applies a control signal for one half period and a control signal for the other half period to the DC-AC converter 163. During one half period, the upper transistor T41 of one half-bridge transistor circuit is turned on, and the lower transistor T42 thereof is turned off. The upper transistor T44 of the other half-bridge transistor circuit is turned off, and the lower transistor T43 thereof is turned on. During the other half period, the upper transistor T41 of one half-bridge transistor circuit is turned off, and the lower transistor T42 thereof is turned on. The upper transistor T44 of the other half-bridge transistor circuit is turned on, and the lower transistor T43 thereof is turned off. Two transistor operating modes may be synchronized with a lower-power sine wave signal of the oscillator 130. In order to inhibit a short circuit occurring by simultaneously turning on the upper and the lower transistors, the upper and lower transistor control signals may have a dead time slot.

According to another embodiment, the voltage difference measuring unit 181 may obtain the measurement output current value based on the difference between voltages applied to both terminals of the resistor R1, the DC power generation controller 191 may obtain a measurement output power value, which is a present output power value of the power supply 110, based on the measurement output current value, and may determine the operating mode of the DC-AC converter 163 based on the measurement output power value. In this case, the operating mode may be one of the full-bridge operating mode and the half-bridge operating mode. The DC power generation controller 191 may compare the measurement output power value with the reference value and determine the operating mode of the DC-AC converter 163 according to the comparison result. In this case, the reference value may be in the desirable current range of table 2 set according to the initial output voltage value. If the measurement output power value is greater than the reference value, the DC power generation controller 191 may determine the operating mode of the DC-AC converter 163 as a full-bridge operating mode. If the measurement output power value is smaller than the reference value, the DC power generation controller 191 may determine the operating mode of the DC-AC converter 163 as the half-bridge operating mode.

The DC-AC converter 163 converts the output power of the power supply 110 into the AC power having the rectangular-waveform AC voltage V3 based on the AC power generation control signal (step S313), and outputs the output power to the transmission induction coil unit 210.

The wireless power transmitting apparatus 200 transmits the rectangular-waveform AC power having the rectangular-waveform AC voltage V3 to the wireless power receiving apparatus 300 by resonance (step S315).

Hereinafter, a power supply device 100 according to still another embodiment will be described with reference to FIGS. 16 to 19.

Figure 16:
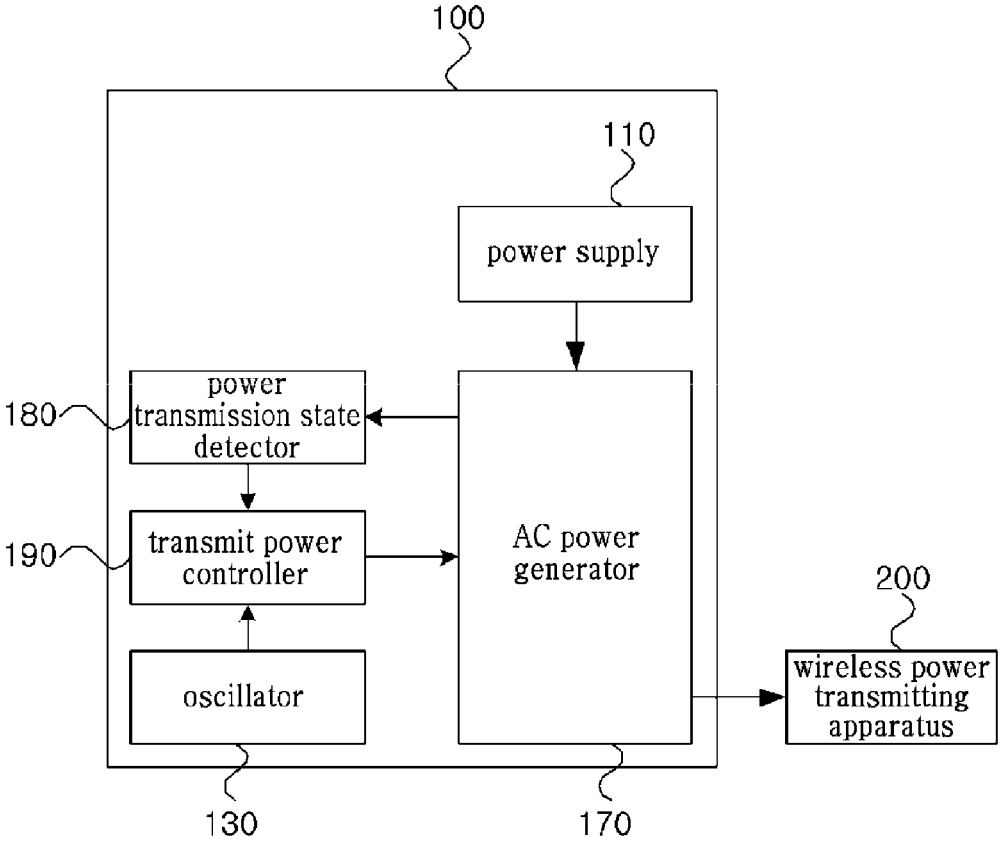
FIG. 16 is a block diagram showing a power supply device according to still another embodiment.

FIG. 16 is a block diagram showing the power supply device 100 according to still another embodiment.

As shown in FIG. 16, the power supply device 100 according to still another embodiment includes a power supply 110, an oscillator 130, an AC power generator 170, a power transmission state detector 180, and a transmit power controller 190. In addition, the power supply device 100 is connected with the wireless power transmitting apparatus 200.

The power supply 110 generates DC power having DC voltage and outputs the DC power through an output terminal thereof.

The oscillator 130 generates a lower-power sine wave signal.

The power transmission state detector 180 detects the wireless power transmission state.

The transmit power controller 190 generates a control signal to control the AC power generator 170 based on the detected wireless power transmission state and the lower-power sine wave signal of the oscillator 130.

The AC power generator 170 generates AC power having rectangular-waveform voltage by amplifying the lower-power sine wave signal of the oscillator 130 using DC power of the power supply 110 according to the control signal of the transmit power controller 190.

The wireless power transmitting apparatus 200 transmits the output power of the AC power generator 170 to the wireless power receiving apparatus 300 by resonance.

Figure 17:
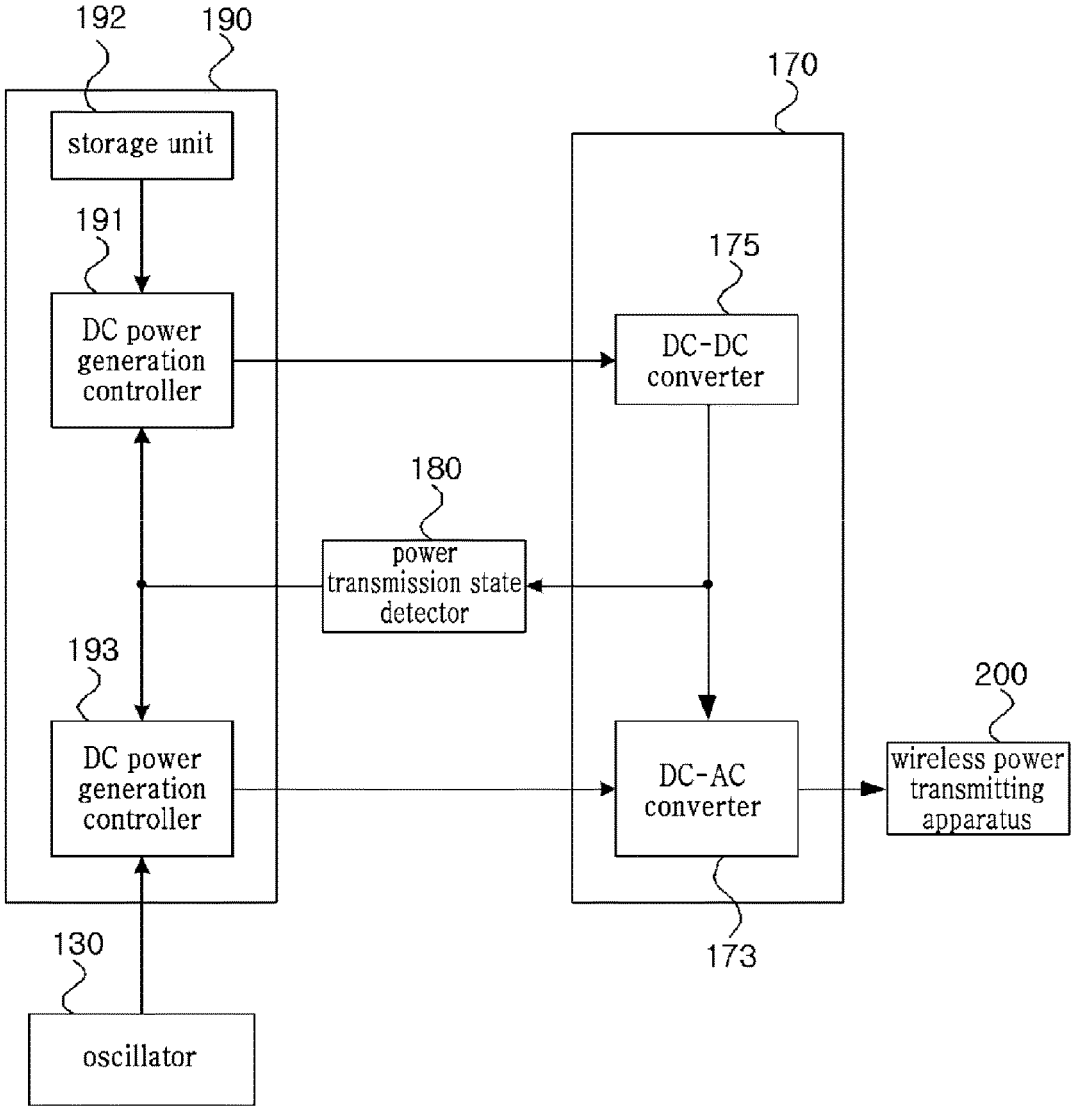
FIG. 17 is a block diagram showing an AC power generator and a transmit power controller according to still another embodiment.

FIG. 17 is a block diagram showing the AC power generator 170 and the transmit power controller 190 according to still another embodiment.

As shown in FIG. 17, the AC power generator 170 according to still another embodiment includes a DC-DC converter 175 and a DC-AC converter 173, and the transmit power controller 190 includes an DC power generation controller 191, a storage unit 192, and an AC power generation controller 193.

The DC power generation controller 191 generates a DC power generation control signal based on the detected wireless power transmission state so that the DC-DC converter 175 may output DC power having output current in a target current range and target DC voltage.

The storage unit 192 stores a look-up table.

The DC-DC converter 175 converts the output power of the power supply 110 into the DC power, which has output current in the target current range and the target DC voltage, based on the DC power generation control signal.

The AC power generation controller 193 generates an AC power generation control signal based on the lower-power sine wave signal of the oscillator 130. In addition, the AC power generation controller 193 may generate the AC power generation control signal, which allows the DC-DC converter 175 to output DC power having the output current in the target current range, based on the detected wireless power transmission state. The target current range may be the range of the peak-to-peak value of the target current.

The DC-AC converter 173 converts the output power of the DC-DC converter 155 into the rectangular-waveform power based on the AC power generation control signal, and outputs the power to the transmission induction coil unit 210.

Figure 18:
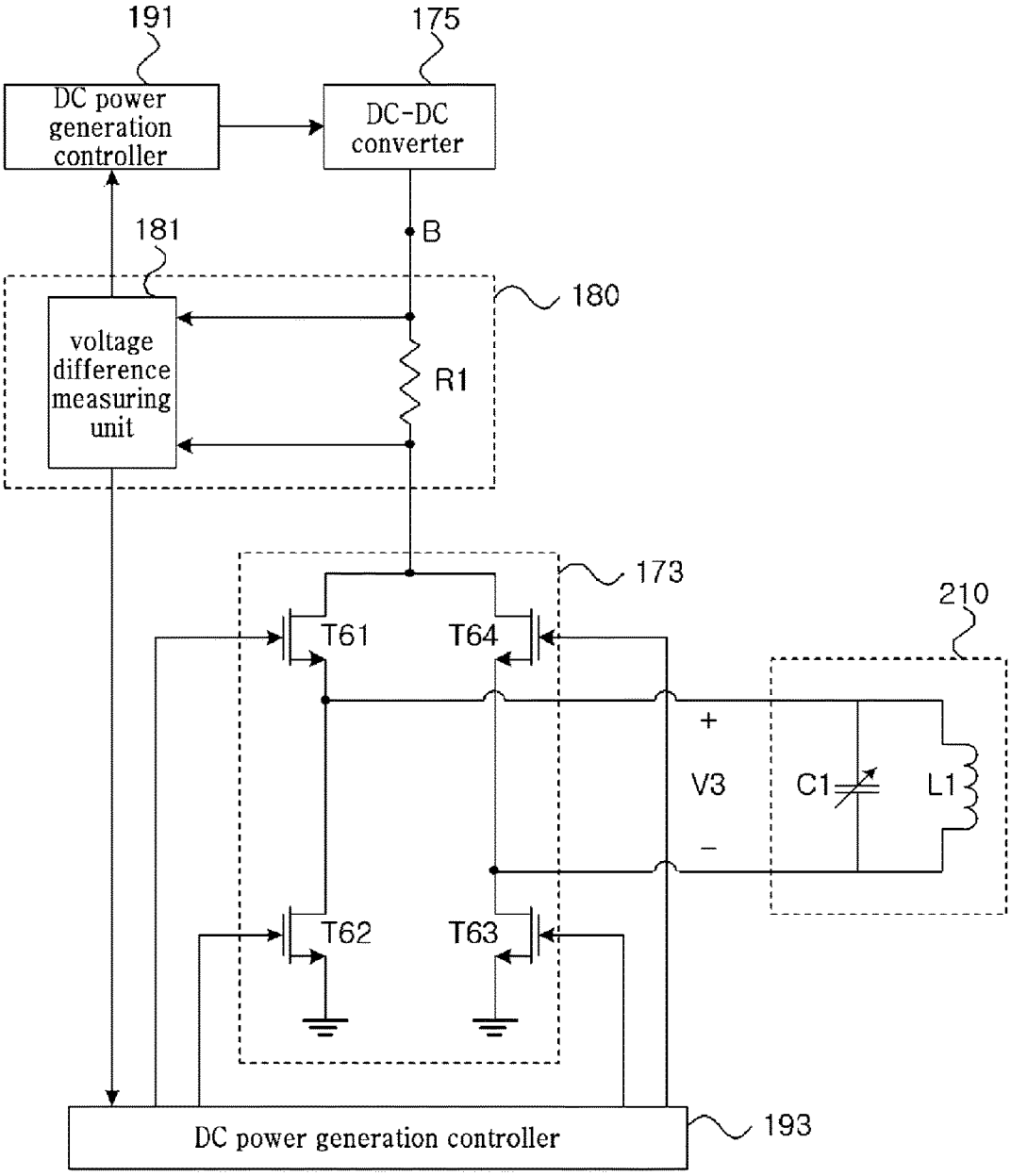
FIG. 18 is a circuit diagram showing a DC-AC converter and a power transmission state detector according to still another embodiment.

FIG. 18 is a circuit diagram showing the DC-AC converter 173 and the power transmission state detector 180 according to still another embodiment.

As shown in FIG. 18, the DC-AC converter 173 includes a full-bridge transistor circuit unit. The full-bridge transistor circuit unit includes two half-bridge transistor circuits. One of the two half-bridge transistor circuits includes upper and lower transistors T61 and T62, and the other includes upper and lower transistors T64 and T63. The upper transistors T61 and T64, and the lower transistors T62 and T63 may be n-channel metal-oxide-semiconductor field-effect transistors (NMOS-FETs), and may be substituted with different devices performing the same operation.

The power transmission state detector 180 includes a resistor R1 and the voltage difference measuring unit 181, and is connected to the DC-DC converter 175, the DC-AC converter 173, and the AC power generation controller 193.

The DC-AC converter 173 is connected to the DC-DC converter 175 through the resistor R1.

The AC power generation controller 193 has first and second upper transistor control signal output terminals and first and second lower transistor control signal output terminals, and generates an AC power generation control signal based on the lower-power sine wave signal of the oscillator 130 and a wireless power transmission state.

A drain electrode of the upper transistor T61 is connected with one terminal of the resistor R1, a gate electrode of the upper transistor T61 is connected with the first upper transistor control signal output terminal of the AC power generation controller 193, and a source electrode of the upper transistor T61 is connected with one terminal of the inductor L1.

A drain electrode of the lower transistor T62 is connected with the source electrode of the upper transistor T61, a gate electrode of the lower transistor T62 is connected to the first lower transistor control signal output terminal of the AC power generation controller 193, and a source electrode of the lower transistor T62 is connected with the ground.

A drain electrode of the upper transistor T64 is connected with one terminal of the resistor R1, a gate electrode of the upper transistor T64 is connected with the second upper transistor control signal output terminal of the AC power generation controller 193, and a source electrode of the upper transistor T64 is connected with an opposite terminal of the inductor L1.

A drain electrode of the lower transistor T63 is connected with the source electrode of the upper transistor T64, a gate electrode of the lower transistor T63 is connected to the second lower transistor control signal output terminal of the AC power generation controller 193, and a source electrode of the lower transistor T63 is connected with the ground.

The voltage difference measuring unit 181 measures the difference between voltages applied to both terminals of the resistor R1.

Hereinafter, a wireless power transmitting method will be described with reference to FIG. 19 according to still another embodiment.

Figure 19:
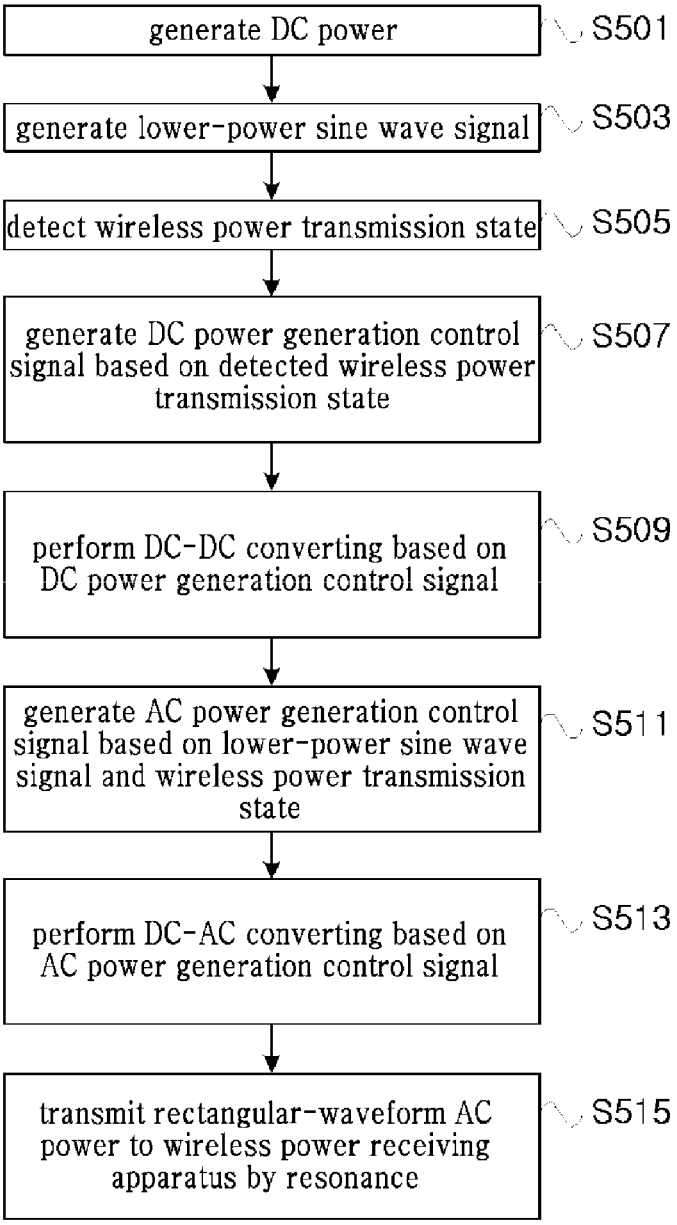
FIG. 19 is a flowchart showing a wireless power transmitting method according to still another embodiment.

FIG. 19 is a flowchart showing the wireless power transmitting method according to still another embodiment.

In particular, FIG. 19 shows the wireless power transmitting method to explain the embodiments of FIGS. 16 to 18 in detail.

The power supply 110 generates DC power having DC voltage (step S501). In particular, the power supply 110 may convert AC power having AC voltage into the DC power having DC voltage.

The oscillator 130 generates the lower-power sine wave signal (step S503).

The power transmission state detector 180 detects the wireless power transmission state (step S505). The power transmission state detector 180 may detect the wireless power transmission state based on the level of the output current of the DC-DC converter 175. Since the voltages applied to the both terminal of the resistor R1 are proportional to the level of the output current of the power supply 110, the voltage difference measuring unit 181 of the power transmission state detector 180 may detect the wireless power transmission state based on the different between the voltages applied to both terminals of the resistor R1. Since the output current of the DC-DC converter 175 may not be constantly maintained, the power transmission state detector 180 may measure the peak-to-peak value of the output current of the DC-DC converter 175.

The DC power generation controller 191 generates a DC power generation control signal based on the detected wireless power transmission state so that the DC-DC converter 175 may output DC power having current in the target current range and target DC voltage (step S507), and outputs the DC power generation control signal to the gate electrode of the transistor T11. Details of step S507 have already been described in step S107.

The DC-DC converter 175 converts the output power of the power supply 110 into DC power having the output current in the target current range and the target DC voltage based on the DC power generation control signal (step S509).

The AC power generation controller 193 generates the AC power generation control signal allowing the DC-DC converter 175 to output DC power having the output current in the target current range, based on the detected wireless power transmission state (step S511), and outputs the AC power generation control signal to the DC-AC converter 173. Details of step S511 have already been described in step S311.

The DC-AC converter 173 converts the output power of the power supply 110 into the AC power having the rectangular-waveform AC voltage V3 based on the AC power generation control signal (step S513), and outputs the output power to the transmission induction coil unit 210.

The wireless power transmitting apparatus 200 transmits the rectangular-waveform AC power having the rectangular-waveform AC voltage V3 to the wireless power receiving apparatus 300 by resonance (step S515).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

[1. A wireless power transmitting apparatus wirelessly transmitting power to a wireless power receiving apparatus, the wireless power transmitting apparatus comprising:

a detector detecting a wireless power transmission state between the wireless power transmitting apparatus and the wireless power receiving apparatus;

a transmit power controller generating a control signal to control transmit power based on the detected wireless power transmission state;

an AC power generator generating an AC power using a first DC power, wherein the generated AC power is determined based on the control signal; and a transmission coil unit transmitting the AC power to the wireless power receiving apparatus;

wherein the AC power generator comprises:

a DC-DC converter converting the first DC power into a second DC power, wherein the second DC power is determined based on the control signal; and a DC-AC converter converting the second DC power into the AC power;

wherein the detector detects the wireless power transmission state based on a level of an output current of the DC-DC converter, and wherein the detector detects the wireless power transmission state based on a peak-to-peak level of the output current of the DC-DC converter.]

[2. The wireless power transmitting apparatus of claim 1, wherein the transmit power controller comprises a DC power generation controller generating a DC power generation control signal based on the detected wireless power transmission state, and wherein the second DC power is determined based on the DC power generation control signal.]

[3. The wireless power transmitting apparatus of claim 2, wherein the DC power generation controller changes a duty cycle of the DC power generation control signal based on the detected wireless power transmission state.]

[4. The wireless power transmitting apparatus of claim 1, wherein the DC-AC converter comprises a transistor circuit unit including a half-bridge structure.]

[5. The wireless power transmitting apparatus of claim 1, wherein the AC power generator comprises a full-bridge transistor circuit unit capable of operating at a half-bridge operating mode and a full-bridge operating mode, wherein the transmit power controller comprises an AC power generation controller selecting one of the half-bridge operating mode or the full-bridge operating mode based on the detected wireless power transmission state, and generating an AC power generation control signal corresponding to the selected operating mode, and wherein the full-bridge transistor circuit unit converts the second DC power into the AC power based on the AC power generation control signal.]

[6. The wireless power transmitting apparatus of claim 5, wherein the full-bridge transistor circuit unit comprises:

a first transistor comprising a drain electrode having DC power applied thereto and a source electrode connected to one terminal of the transmission coil unit;

a second transistor comprising a drain electrode connected to the source electrode of the first transistor and a source electrode connected to a ground;

a third transistor comprising a drain electrode having the DC power applied thereto and a source electrode connected to an opposite terminal of the transmission coil unit; and a fourth transistor comprising a drain electrode connected to the source electrode of the third transistor and a source electrode connected to the ground.]

[7. The wireless power transmitting apparatus of claim 6, wherein, in the half-bridge operating mode, the transmit power controller turns off the third transistor, turns on the fourth transistor, turns on the first transistor, turns off the second transistor during one half period, and turns off the first transistor and turns on the second transistor during a remaining half period.]

[8. The wireless power transmitting apparatus of claim 6, wherein, in the full-bridge operating mode, the transmit power controller turns on the first and fourth transistors and turns off the second and third transistors during one half period, and turns off the first and fourth transistors and turns on the second and third transistors during a remaining half period.]

[9. The wireless power transmitting apparatus of claim 1, wherein the AC power is a rectangular-waveform power.]

*10. A method of controlling a wireless power transmitter, the method comprising:*

*providing a DC power to an AC power generator;*

*generating, via the AC power generator, an AC power signal having a predetermined frequency to transmit wireless power;*

*transmitting state information of the wireless power transmitter using the predetermined frequency, the state information of the wireless power transmitter including a maximum power of the wireless power transmitter to be supplied from the wireless power transmitter and an available power of the wireless power transmitter;*

*detecting a variation of consumption of the wireless power;*

*in response to the variation being less than a reference value, transmitting, by the AC power generator, the wireless power to have a first waveform; and*

*in response to the variation being equal to or greater than the reference value, transmitting, by the AC power generator, the wireless power to have a second waveform different from the first waveform,*

*wherein the generating the AC power comprises:*

*converting, via a DC-DC converter included in the AC power generator, a first DC power into a second DC power determined based on a control signal; and*

*converting, via a DC-AC converter included in the AC power generator, the second DC power into the wireless power, and*

*wherein the detecting the variation of the consumption of the wireless power comprises detecting the variation based on a level of an output current of the DC-DC converter and based on an adjustment of a switch and a resistor included in a wireless power receiver consuming the transmitted wireless power.*

*11. The method of claim 10, wherein the AC power generator includes a full bridge transistor circuit for operating in a full bridge mode or a half bridge mode.*

*12. The method of claim 11, wherein the AC power generator operates in the half bridge mode for transmitting the first waveform.*

*13. The method of claim 12, wherein the AC power generator operates in the full bridge mode for transmitting the second waveform.*

*14. The method of claim 11, wherein the full bridge transistor circuit includes a first half bridge circuit and a second half bridge circuit.*

*15. The method of claim 14, wherein the AC power generator includes a controller operating the first half bridge circuit and stopping operation of the second half bridge circuit in the half bridge mode.*

*16. The method of claim 15, wherein the controller operates the first half bridge circuit and the second half bridge circuit in the full bridge mode.*

*17. The method of claim 10, wherein the detecting the variation of consumption of the wireless power comprises detecting a power consumption of the wireless power based on the switch being opened or closed and in series with the resistor, and*

*wherein the power consumption is increased when the switch is closed and decreased when the switch is opened.*

*18. The method of claim 10, further comprising:*

*determining state information of the wireless power receiver including a change of a charge quantity of the wireless power.*

*19. The method of claim 18, wherein the AC power has the first waveform or the second waveform different than the first waveform based on the state information of the wireless power receiver.*

*20. A wireless power transmitter wireless transmitting power to a wireless power receiver, the wireless power transmitter comprising:*

*an AC power generator configured to generate an AC power signal having a predetermined frequency to transmit wireless power;*

*a detector configured to detect a variation of consumption of the wireless power; and*

*a controller configured to:*

*control the AC power generator to transmit state information of the wireless power transmitter using the predetermined frequency, the state information of the wireless power transmitter including a maximum power of the wireless power transmitter to be supplied from the wireless power transmitter and an available power of the wireless power transmitter;*

*in response to the variation being less than a reference value, control a transistor circuit of the AC power generator to transmit the wireless power to have a first waveform; and*

*in response to the variation being equal to or greater than the reference value, control the transistor circuit of the AC power generator to transmit the wireless power to have a second waveform different from the first waveform,*

*wherein the AC power generator comprises:*

*a DC-DC converter configured to convert a first DC power into a second DC power determined based on a control signal; and*

*a DC-AC converter configured to convert the second DC power into the wireless power, and*

*wherein the detector detects the variation of consumption of the wireless power based on a level of an output current of the DC-DC converter and based on an adjustment of a switch and a resistor included in a wireless power receiver consuming the transmitted wireless power.*

*21. The wireless power transmitter of claim 20, wherein the AC power generator includes a full bridge transistor circuit for operating in a full bridge mode or a half bridge mode.*

*22. The wireless power transmitter of claim 21, wherein the AC power generator operates in the half bridge mode for transmitting the first waveform.*

*23. The wireless power transmitter of claim 22, wherein the AC power generator operates in the full bridge mode for transmitting the second waveform.*

*24. The wireless power transmitter of claim 21, wherein the full bridge transistor circuit includes a first half bridge circuit and a second half bridge circuit.*

*25. The wireless power transmitter of claim 24, wherein the controller operates the first half bridge circuit and stops operation of the second half bridge circuit in the half bridge mode.*

*26. The wireless power transmitter of claim 25, wherein the controller operates the first half bridge circuit and the second half bridge circuit in the full bridge mode.*

*27. The wireless power transmitter of claim 20, wherein the controller detects the variation of consumption of the wireless power by detecting a power consumption of the wireless power based on the switch being opened or closed and in series with the resistor, and*

*wherein the power consumption is increased when the switch is closed and decreased when the switch is opened.*

*28. The wireless power transmitter of claim 20, wherein the controller is further configured to:*

*determine state information of the wireless power receiver including a change of a charge quantity of the wireless power.*

*29. The wireless power transmitter of claim 28, wherein the AC power has the first waveform or the second waveform different than the first waveform based on the state information of the wireless power receiver.*

* * * * *